(12) United States Patent
Hadden et al.

(10) Patent No.: US 12,355,797 B2
(45) Date of Patent: Jul. 8, 2025

(54) SYSTEM FOR COLLECTING COMPUTER NETWORK ENTITY INFORMATION EMPLOYING ABSTRACT MODELS

(71) Applicant: Rapid7, Inc., Boston, MA (US)

(72) Inventors: Allen D. Hadden, Stow, MA (US); Hugh Pyle, Salem, MA (US); Kenneth Allen Rogers, Stow, MA (US)

(73) Assignee: RAPID7, INC., Boston, MA (US)

( * ) Notice: Subject to any disclaimer, the term of this patent is extended or adjusted under 35 U.S.C. 154(b) by 166 days.

(21) Appl. No.: 17/724,968

(22) Filed: Apr. 20, 2022

(65) Prior Publication Data

US 2022/0337620 A1    Oct. 20, 2022

Related U.S. Application Data

(60) Provisional application No. 63/177,158, filed on Apr. 20, 2021.

(51) Int. Cl.
*H04L 9/40*    (2022.01)
*H04L 41/22*   (2022.01)

(52) U.S. Cl.
CPC ......... *H04L 63/1433* (2013.01); *H04L 41/22* (2013.01); *H04L 63/1416* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,069,849 B2 | 9/2018 | Muddu et al. | |
| 10,958,674 B2 | 3/2021 | Tsironis | |
| 11,503,054 B2 | 11/2022 | Furtak | |
| 11,729,204 B1* | 8/2023 | Coull | H04L 63/1433 726/25 |
| 12,120,134 B2 | 10/2024 | Rogers et al. | |
| 2014/0372956 A1 | 12/2014 | Bisca et al. | |
| 2015/0026158 A1 | 1/2015 | Jin | |
| 2015/0237062 A1 | 8/2015 | Roytman et al. | |
| 2015/0249669 A1* | 9/2015 | Gamage | H04L 63/10 726/26 |
| 2016/0224911 A1 | 8/2016 | Rush et al. | |
| 2017/0017708 A1 | 1/2017 | Fuchs et al. | |
| 2017/0063894 A1 | 3/2017 | Muddu et al. | |
| 2017/0236079 A1 | 8/2017 | Venna et al. | |
| 2018/0027004 A1* | 1/2018 | Huang | H04L 43/04 726/23 |
| 2019/0158309 A1 | 5/2019 | Park et al. | |
| 2019/0158524 A1 | 5/2019 | Zadeh et al. | |
| 2019/0278777 A1 | 9/2019 | Malik et al. | |

(Continued)

*Primary Examiner* — Atta Khan
(74) *Attorney, Agent, or Firm* — Wolf, Greenfield & Sacks, P.C.

(57) ABSTRACT

An entity tracking system and method for a computer network employs proactive data collection and enrichment driven by configurable rules and workflows responsive to the discovery of new entities, changes to existing entities, and specifics about the entities' attributes. The data collection is used in conjunction with graph technologies to map interactions and relationships between various entities interacting in the computer environment and deduce interactions and relationships between the entities. The method and system provides for abstract entity types and collation nodes.

21 Claims, 21 Drawing Sheets

(56) References Cited

U.S. PATENT DOCUMENTS

| | | |
|---|---|---|
| 2020/0226156 A1 | 7/2020 | Borra et al. |
| 2020/0272972 A1 | 8/2020 | Harry et al. |
| 2021/0234889 A1 | 7/2021 | Burle et al. |
| 2021/0352098 A1 | 11/2021 | Rogers et al. |
| 2021/0352099 A1 | 11/2021 | Rogers |
| 2022/0004546 A1 | 1/2022 | Rogers et al. |
| 2023/0275912 A1* | 8/2023 | Shahul Hameed ..... H04L 41/16 726/23 |

\* cited by examiner

```
# Generic base type for storage components
# Examples might include: Disk, Bucket, Snapshot
x-samos-type-name: core.components.storage
title: Data Storage Component
description: A component that stores data.
type: object
x-samos-abstract: true
x-samos-extends-types:
  - type-name: core.component
properties:
  encrypted:
    title: Encrypted
    description: Identifies whether the storage is encrypted.
    type: boolean
  uri:
    title: URI
    description: Specifies the URI for the storage.
    type: string
```

FIG. 5

```
properties:
  instanceId:
    title: ID
    type: string
    x-samos-fulfills:
      type-name: core.component
      property-name: id
```

```
x-samos-derived-properties:
  name:
    title: Name
    type: string
    syntax: jsonpath
    value: $.Tags[?(@.Key=="Name")].Value
    x-samos-fulfills:
      type-name: core.named-object
      property-name: name
```

```
properties:
  PublicDnsName:
    title: Public DNS Name
    x-samos-ref-types:
      - type-name: core.observables.domain-name
```

FIG. 9

```
x-samos-virtual:
  vulnerabilities:
    # Allow user to access the asset's vulnerabilities via the "vulnerabilities" property
    gremlin:
      - operator: inE
        arguments:
          - e:vulnScanner.finding:vulnScanner-asset-id
      - operator: outV
    type-name: vulnScanner.finding
```

```
properties:
  mac:
    title: MAC Address
    x-samos-correlation:
      correlation-key: core.observables.mac-addr.value
      correlation-type: core.components.machine
      priority: 4
```

```
# Assign each concrete vertex a correlation ID that groups them together
nextCorrelationId = 0

For vertex in all concrete node vertices
    if not visited(vertex)
        # visit all concrete node vertices connected via a correlation value
        group = traverseViaCorrelationValues(vertex)

# All vertices in group are part of the same correlation
        group.each { v -> v.correlationId = nextCorrelationId } nextCorrelationId = nextCorrelationId + 1

Def traverseViaCorrelationValues(vertex)
    # Group initially contains the starting vertex
    group = {vertex}

# Mark vertex as visited
    visit(vertex)

For adjacentVertex in vertex.getAdjacentConcreteVertices()
        If not visited(adjacentVertex)
            # Add in adjacent vertices
            group += traverseViaCorrelationValues(adjacentVertex)

return group
```

FIG. 15

```
"id": "UUID GOES HERE",
"rule-type": "exclude",
"name": "Exclude bogus SerialNumber",
"description": "Exclude bogus serial number",
"correlation-key": "SerialNumber",
"exclude-values": ['123456789'],
"exclude-expression": None,
```

```
"id": "UUID GOES HERE",
"rule-type": "include",
"name": "Include mac for subtype4",
"description": "Include MAC address for subtype4",
"type": "subtype4",
"correlation-key": "MacAddr",
"rule-type": "include",
"include-expression": "content.MacAddr",
```

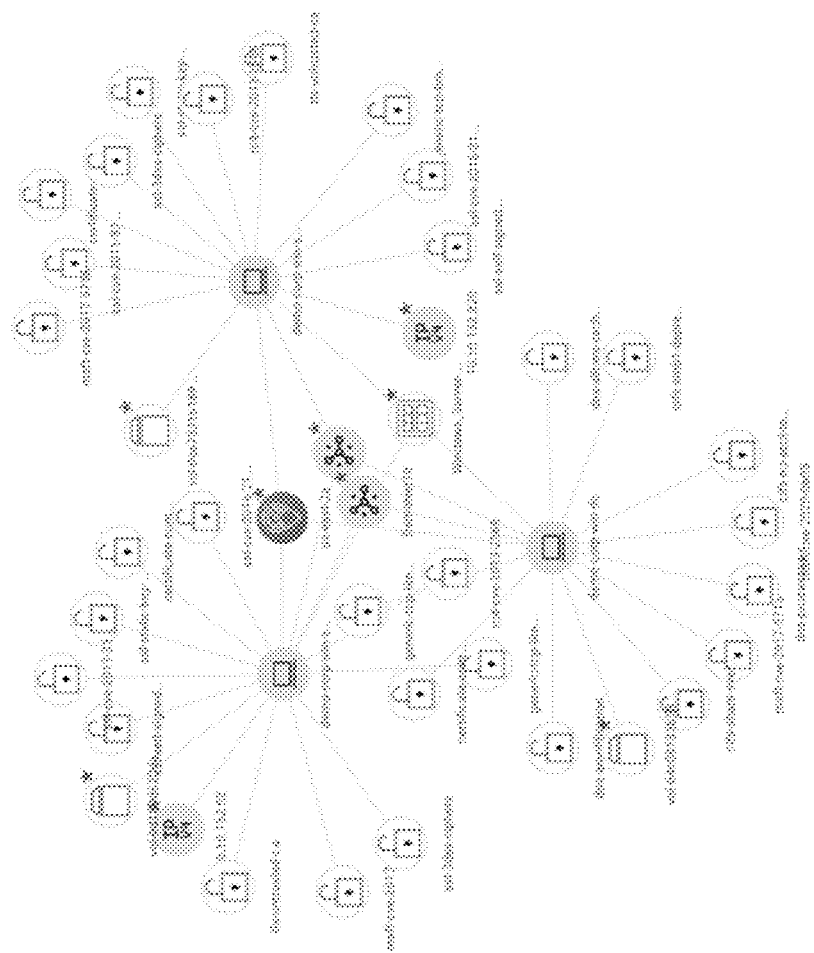
FIG. 18
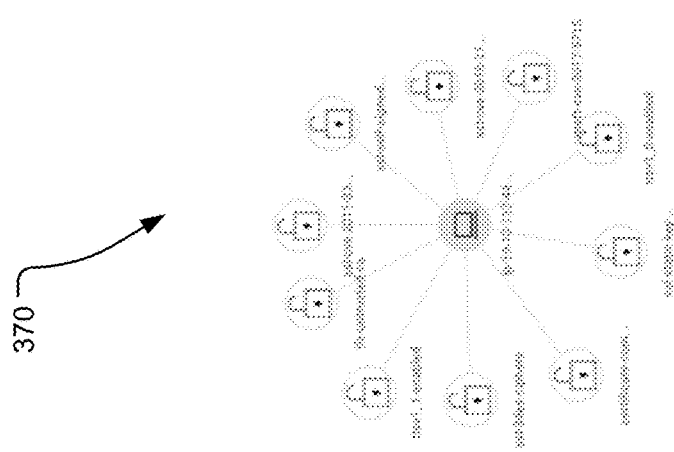
370

SYSTEM FOR COLLECTING COMPUTER NETWORK ENTITY INFORMATION EMPLOYING ABSTRACT MODELS

RELATED APPLICATIONS

This application claims the benefit under 35 USC 119(e) of U.S. Provisional Application No. 63/177,158, filed on Apr. 20, 2021, which is incorporated herein by reference in its entirety.

BACKGROUND OF THE INVENTION

Computer networks and systems have become increasingly complex over time. This process has accelerated more recently due to the adoption of technological trends such as bring-your-own-device (BYOD), Internet-of-things (IoT), cloud infrastructure, containerization, and microservices architectures, to list a few examples. Modern computer systems can comprise tens, hundreds, or even thousands of interacting independent systems and services. These systems can be transient, frequently appearing and then disappearing from a computer network based on fluctuating demand, ongoing changes/enhancements to software, and hardware or software faults. These interacting services can be spread across multiple geographic locations and computing environments and might include traditional on-premise infrastructure at multiple different sites working in conjunction with private cloud environments and possibly multiple different public cloud environments.

The technological trends driving the increasing complexity of computer networks offer significant advantages such as better redundancy and fault tolerance, scalability and burst-ability, and cost efficiency, to name a few.

At the same time, teams responsible for information technology (IT) management, cybersecurity, data privacy and compliance face significant new challenges.

The dynamic nature of modern computer environments makes it extremely challenging for organizations to maintain accurate catalogues of all entities present or interacting in their computer environments. It is not feasible to depend on human users to be responsible for maintaining an accurate catalogue of computer assets and other entities. While humans can play a role in the process, organizations increasingly face a need to adopt techniques that automate the process of maintaining, or being able to quickly generate, a list of current entities in the environment along with their significant attributes. Many IT and cybersecurity use cases can be aided by an accurate catalogue of entities in the computer environment that is always accurate and up to date, accessible via application programming interfaces (APIs), includes a high degree of detailed attribute information about each entity, and also captures information about how the many entities relate to, or interact with, each other.

Additionally, traditional approaches focused primarily on the existence of physical computers and the specific operating systems and software (and versions thereof) that were running on them. This limited perspective has become inadequate. Physical computers, perhaps with the exception of individual, dedicated, personal-use computers such as laptops, have been virtualized away. Increasingly, physical computer servers are organized in clusters that are responsible for running large numbers of virtual servers simultaneously. A mass adoption of new virtualization approaches including containerization has been driven by and is itself a driver of an accelerated adoption of microservices architectures, in which large monolithic business applications are broken down into many smaller and autonomous service applications that interact with each other. As a result, in modern computer environments, instead of worrying about a single monolithic software application running on a single dedicated physical computer, IT and cybersecurity professionals now need to worry about hundreds or thousands of microservices which are dynamically added and removed, scattered across multiple environments and interconnected networks, and interacting in complex patterns that constitute each logical business application. Considering that a large enterprise typically has hundreds of distinct business applications, the challenges of understanding, maintaining, and securing such an expansive and dynamic environment become obvious.

While the complexity of modern computer environments has increased dramatically, the number of skilled and qualified individuals to monitor, maintain and secure these environments has not kept up with demand. As of the end of 2019, there was an estimated shortfall of over four million unfilled cybersecurity positions worldwide, and that number is increasing dramatically. Thus, there is a critical need for organizations to find ways to move work from, and increase the efficiency of, the limited number of IT and security professionals they have on staff to ensure that those limited resources are focused on the most critical tasks that only they can do.

One of the key challenges IT and security teams face is establishing and maintaining a continuously accurate registry of all computer and network assets, along with other technical and nontechnical entities, interacting on their computer networks. Without this information, teams struggle to assess cyber risks or identify nefarious activity and therefore struggle to protect their environment from cyber-attack.

The problem of maintaining an accurate list of computer assets is not a new one. It has existed since the early days of networked computers. There are many products which have been developed over time to assist in dealing with the challenge. Entire product categories were established in the areas of IT Asset Management (ITAM) and Change Management Databases (CMDB). However, traditional approaches tended to require a high degree of manual interaction to keep them accurate as systems were added, removed and modified, and the process was error prone. This problem has been exacerbated by an explosion in the number of connected devices due to the adoption of BYOD, IoT, cloud infrastructure, microservices architectures, containerization, and other technologies. Increasingly, products aiming to address this issue have begun to adopt automatic collection of information passively from various sources and some degree of proactive scanning to populate and maintain an asset registry. However, the results are often flawed, resulting in stakeholders doubting the accuracy of the data and opting not to use it.

With the increasing scale and dynamic nature of IT infrastructure, existing static tools to track individual systems are no longer adequate. Instead, asset managers must be able to analyze arbitrarily dynamic groupings of fast-moving entities in the computer environment without losing the ability to understand the big picture.

Organizations have invested large sums of money and effort to purchase, deploy, and maintain a variety of technologies that focus on various aspects of the IT management and cybersecurity problem spaces. Each of those technologies generates a great deal of valuable information which paint small pieces of the overall picture of the computer environment. However, the data tends to be silted and uncorrelated, making it difficult to see the "big picture." Security information and event management (SIEM) technologies were created to pull together and correlate this information but have been only partially successful due to the massive amounts of data which they attempt to consume, the cost and effort required to keep them properly tuned, and the large volume of false positives which they tend to generate.

Recently, Rogers, Hadden, Roberts, and Pyle have described a system for automatically discovering, enriching, and remediating entities interacting in a computer network in U.S. Pat. Appl. Pub. No. US 2022/0004546, which is incorporated herein in its entirety. This system functions to discover and track network entities, new entities arriving on the computer network, previously known entities leaving the network, changes to important attributes of each entity, and the interactions or relationships between entities. This insight enables or augments a broad set of IT and cybersecurity use cases including cyber risk assessment, cybersecurity incident response, policy compliance and audit, vulnerability management, and many others. This system automates the discovery of entities, both transiently or permanently present, in an organization's computer networks, the collection of important details and attributes about each entity, and the tracking of interactions and relationships between the various entities. Then, based on the information discovered, collected and tracked, the system can execute automated actions driven by configurable rules to proactively collect further details about the entities or their relationships and/or to bring the entities into compliance with some desired configuration or state.

SUMMARY OF THE INVENTION

The present invention concerns an extensible system and/or method for collecting fragments of information about a set of interacting entities of various types from a multitude of information sources, each information source with its own perspective and data schema. In this context, each information source provides a subset of information about the attributes and relationships of a subset of the entities. These fragments of information are stored independently but also correlated and mapped into a cohesive model of correlated entities, their attributes, and the relationships between the entities.

In addition, the present invention also concerns the systems and methods for overlaying, on the dataset, a higher-level and consistent "abstract model" of entities and the entities' attributes and relationships. Then, a query interface can be provided that allows users or other systems to query the abstract model as if the various attributes and relationships of each of the multiple independent but correlated perspectives, which are referring to the same actual entity, are combined into a single cohesive entity by the abstract model. In this way, users need only to be familiar with the consistent abstract model and not the inconsistent and possibly complex concrete model provided by each of the various information sources across all of the various entity types.

One of many benefits of the present approach is that it can avoid the negative consequences of forcing all of the information from the various information sources into a pre-defined and static data model and of discarding the information which does not fit into that generalized model at the time the information was encountered or ingested.

The problem of trying to discover and model a network of inter-related entities of various types from partial information from a multitude of information sources is common across many disciplines and problem spaces. For the purposes of illustration and simplicity, the focus here is on the example of an organization's computer network and all of the entities which interact on that network and affect the network's security posture. In this example, the various entities can include tangible things such as network devices, computers, storage devices, software, users, etc. It can also include less tangible things such as subnets, vulnerabilities, datasets, access permissions, threats, etc. Each of these entities has their own set of attributes and relationships to the other entities. At the same time, there are a multitude of information sources about those entities. Each information source may contain information about a subset of the attributes and relationships of a subset of the entities. For example, if the organization is running computers in a public cloud provider, then the cloud provider application programming interfaces (APIs) will be a source of a certain set of information about the computer systems running in it but will have no information about computer systems running within the organizations internal networks or those running in a different cloud provider. Moreover, the specific information and data schema for one cloud provider might be entirely different than that of a different cloud provider. At the same time, the organization will probably be using one or more vulnerability scanners to scan some subset of the organization's computers. The APIs of that vulnerability scanning product will be a different information source with an entirely different set of information but which can be correlated with the information provided by the cloud provider APIs for the same actual entities. Similarly, the organization's endpoint security agent, asset register or configuration management database (CMDB), networking devices, and many other sources will also have additional, partially overlapping information about some portion of the various entities interacting on the network.

In general, according to one aspect, the invention features a method of a cybersecurity system for managing a computer environment. This method comprises detecting entities in the computer environment from information obtained from external systems and determining relationships between the detected entities based on the information.

These external systems or entity information sources can be public cloud providers that might be accessed via the cloud provider application programming interfaces (APIs); vulnerability scanners, the organization's endpoint security agent, asset register, configuration management databases (CDMB), networking devices, and many other sources will also have additional, partially overlapping information about some portion of the various entities interacting on the network.

An entity relationship graph is generated by representing the detected entities as nodes and representing relationships between the detected entities as edges between the nodes. Then, the detected entities are categorized into detailed source-specific entity types and providing higher level abstract entity types.

These abstract entity types might be included when an instance of the cybersecurity system is initially installed.

Other abstract entity types might be customized to an organization deploying the cybersecurity system.

Users can then interact with the detected entities via the abstract entity types.

In some implementations, the property definition in the source-specific entity types is annotated to indicate the abstract type and property being fulfilled. Also, schema definitions for source-specific entity types can contain properties that are used to fulfill properties of a corresponding parent abstract type.

In addition, schema definitions for source-specific entity types can include one or more derived properties. These derived properties can be used when there is not a direct mapping between an information element from an information source to a property of abstract entity types.

In general, according to another aspect, the invention features cybersecurity system for managing a computer environment. The system comprises an ingestion subsystem for detecting entities in the computer environment from information obtained from external systems and determining relationships between the detected entities based on the information and a graph server generating an entity relationship graph by representing the detected entities as nodes and representing relationships between the detected entities as edges between the nodes and categorizing the detected entities into detailed source-specific entity types and providing higher level abstract entity types.

In general, according to another aspect, the invention features a method of a cybersecurity system for managing a computer environment. The method comprises detecting entities in the computer environment from information from external systems and determining relationships between the detected entities based on the information and generating an entity relationship graph by representing the detected entities as nodes and representing relationships between the detected entities as edges between the nodes. Finally, nodes are provided that hold attribute information of other nodes.

In the current example, schema definitions are annotated to indicate reference properties that are attributes of another node.

In general, according to another aspect, the invention features method of a cybersecurity system for managing a computer environment. This method comprises detecting entities in the computer environment from information from external systems and determining relationships between the detected entities based on the information and generating an entity relationship graph by representing the detected entities as nodes and representing relationships between the detected entities as edges between the nodes. In addition, the method includes providing virtual edges between nodes to indicate vulnerability findings.

In addition, the virtual edges can be indicated using a graph traversal query language.

In general, according to another aspect, the invention features method of a cybersecurity system for managing a computer environment. This method comprises detecting entities in the computer environment from information from external systems and determining relationships between the detected entities based on the information and generating an entity relationship graph by representing the detected entities as nodes and representing relationships between the detected entities as edges between the nodes. Finally, correlation nodes are provided having edges extending to multiple nodes representing the same detected entities.

In examples, schema definitions include reference properties that refer to another node of a source-specific entity type. In one implementation, a correlation declaration includes a value that is the same among correlated entities.

In addition, correlation triplet nodes can be used, along with exclusion rules and inclusion rules.

In general, according to another aspect, the invention features a cybersecurity system for managing a computer environment. The system comprises an ingestion subsystem for detecting entities in the computer environment from information obtained from external systems and determining relationships between the detected entities based on the information and a graph server generating an entity relationship graph by representing the detected entities as nodes and representing relationships between the detected entities as edges between the nodes and providing correlation nodes having edges extending to multiple nodes representing the same detected entities.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 shows an example snipit of an OpenAPI schema definition;

FIG. 7 is an exemplary snipit of type schema definition in OpenAPI showing how markup is used to indicate which properties of a concrete type ingested from a data source should be used to fulfill properties of its corresponding parent abstract type.

FIG. 8 is an exemplary snipit of type schema definition in OpenAPI showing how markup is used to indicate which properties of a concrete type ingested from a data source;

FIG. 9 is an exemplary snipit of type schema definition in OpenAPI showing how markup is used to indicate reference properties of a concrete type ingested from a data source;

FIG. 10 is an exemplary type definition snippet demonstrating a virtual edge from nodes of one type to related nodes of another type;

FIG. 12 is an exemplary snipit of type schema definition in OpenAPI showing how markup is used to indicate which properties of a concrete type ingested from a data source correlate with other concrete nodes;

FIG. 15 is logic pseudo code showing the implementation of correlation between multiple concrete nodes;

FIG. 16 shows exemplary markup defining an "exclusion rule;"

FIG. 17 shows exemplary markup defining an "inclusion rule;"

FIG. 18 shows a graph display as rendered by the user device, for example, using common icons for abstract entity classes;

DETAILED DESCRIPTION OF THE PREFERRED EMBODIMENTS

Figure 1A:
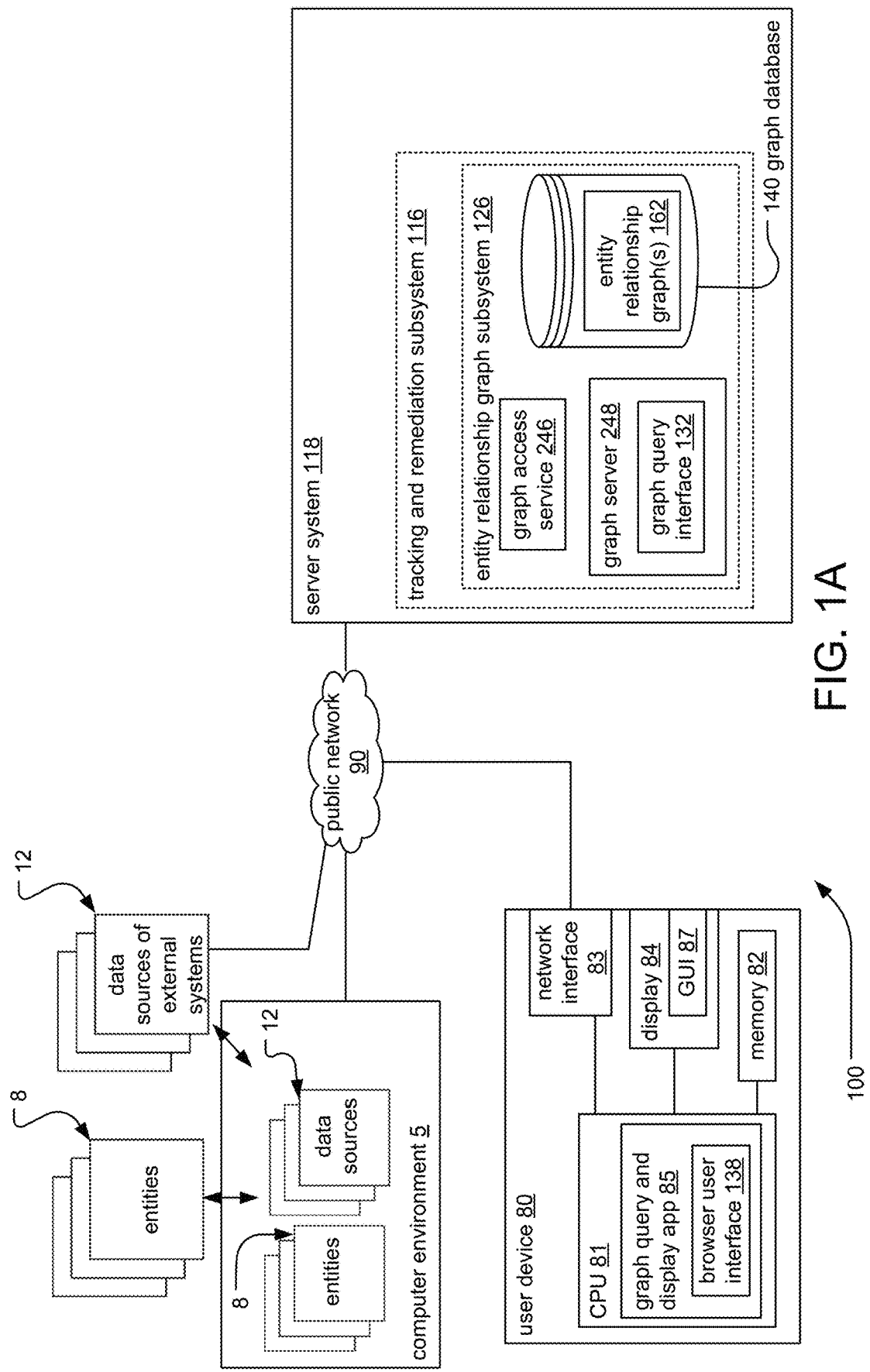
FIG. 1A is a schematic diagram of an exemplary entity discovery, resolution, tracking, and remediation system to which the present invention is applicable.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the presently disclosed system and methods concern establishing a comprehensive accounting and thus understanding of an organization's computer environment(s) 5 such as its computing devices and networks, including all of the entities 8 interacting within or related to those devices and networks, in order to aid in managing the computer environment 5 and other entities interacting with that computer environment. A further objective is to use that understanding of the computer environment 5 to derive further insights that enable or support numerous information technology (IT) and cybersecurity use cases.

In this description the term "entities" should be interpreted as quite broadly encompassing anything, physical, virtual or conceptual, interacting in the business or governmental environments and present on the networks either directly or indirectly. Common examples would be physical computers and network infrastructure components, virtual computing systems (e.g. VMWare or Amazon Web services (AWS) instances), computer operating systems, software programs/services, related software or hardware vulnerabilities, users, security policies and access privileges, data sets, physical locations, threats, threat actors, etc. The present system and method are intended to be configurable and extensible such that each instance can be configured based on which types of entities 8 are of interest for that particular organization or set of use case and should therefore be tracked. The present system and method can be further extended to incorporate new types of entities 8 not previously conceived of or provided out of the box.

FIG. 1A is a schematic diagram of an exemplary entity discovery, resolution, tracking, and remediation system 100 to which the present invention is applicable in one example.

This shows how the system 100 could be deployed on actual computing resources in one example. It should be nevertheless be noted that the functions attributed to particular resources could be implemented on other compute resources or handled by the same or existing resources.

The entity discovery, resolution, tracking, and remediation system 100 comprises, in the illustrated example, a server system 118 and a workstation system for accessing the server system.

The server system 118 is typically implemented as a cloud system. In some cases, the server system 118 is one or more dedicated servers. In other examples, they are virtual servers, or a container-based compute systems. Similarly, the workstation system 112 could run on an actual or virtual workstation. The server system 118 and/or workstation system 112 may run on a proprietary public cloud system, implemented on one of the currently popular cloud systems operated by vendors such as Alphabet Inc., Amazon, Inc. (AWS), or Microsoft Corporation, or any cloud data storage and compute platforms or data centers, in examples. In the public cloud implementation, the underlying physical computing resource is abstracted away from the users of the system. Currently, the server system 118 is implemented as a container-based system running containers, i.e., software units comprising a subject application packaged together with relevant libraries and dependencies, on dusters of physical and/or virtual machines (e.g., as a Kubernetes cluster or analogous implementation using any suitable containerization platform).

In the illustrated example, the computer environment 5, the server system 118, and the user device 80 are all interconnected via a public network 90, which is typically a wide area network such as the internet.

The computer environment 5 is usually associated with an organization and comprises entities 8 as well as data sources 12, which maintain information pertaining to those entities. Data sources 12 are deployed throughout the environment 5 by the organization and are typically existing devices, components, systems, datasets, or applications already present and connected to the computer network or environment 5 in which the present system and method are operating. In the illustrated example, some entities 8 and data sources 12 are also depicted outside of the computer environment 5. These might include data sources 12 and/or entities 8 that are not technically within the computer environment 5 but are related or pertinent to the computer environment 5, providing, for example, supplemental information or event data that can be correlated with that and provide about internal entities 8 that are within the computer environment 5. This depiction is intended to elucidate the expansive nature of the entities and the data sources event data.

Generally, the tracking and remediation subsystem 116 either directly or through the entity event collectors 110 collect the data about the computer environment by connecting to each data source 12 and retrieving the data such as event available from that source 12. Typically, the tracking and remediation system 116 connects to the intended data source 12, typically via an application programming interface (API) 13 implemented by the data source 12. The user of the system provides any credentials necessary to access the APIs 13 of the data sources 12, such as via the user device 80.

The tracking and remediation system 116 look for any data such as event data that provides interesting details, attributes, or properties about the entities 8 or event data that indicates interactions or relationships between the different entities 8 and collect a breadth of event data about all entities 8 of interest from the configured data sources 12. In one example, the tracking and remediation system 116 periodically make calls to the APIs 13 of the data sources 12 to determine if any new entity event information is available. In another example, they receive alerts from the data sources 12 indicating that new event data is available.

In one embodiment, the tracking and remediation system 116 specifically detects relevant changes to the computer environment 5 and/or look for event data indicating the relevant changes, including a presence in the computer environment 5 of new entities 8 that were previously unknown, disappearances from the computer environment 5 of entities 8 that were previously identified as being present in the computer environment 5, and/or changes to properties of entities 8 that were previously identified as being present in the computer environment 5.

In one example, when the tracking and remediation system 116 detects and/or retrieves the event data indicating the relevant changes, generating the entity relationship information may comprise only modifying existing entity relationship information to reflect the relevant changes in the computer environment 5 in response to determining that the relevant changes are not already represented in the existing entity relationship information. In another example, collecting the event data from the different data sources 12 comprises selectively retrieving only event data indicating the relevant changes to the computer environment 5 by periodically polling a data source for new event data reflecting the relevant changes. In yet another example, collecting the event data from the different data sources 12 comprises selectively retrieving only event data indicating the relevant changes to the computer environment 5 in response to alerts transmitted by a data source 12.

The tracking and remediation system 116 includes an entity relationship graph subsystem 126 that creates and maintains the graph database 140, which stores one or more entity relationship graphs 162, for example, for different organizations. The entity relationship graph subsystem 126 further comprises a graph access service 246 and a graph server 248, the latter of which in turn comprises a graph query interface 132. The server system 118 also comprises one or more data stores in the database 140 for persistently storing and managing collections of data.

The user device 80 is generally a computing device operated by a user of the entity discovery, resolution, tracking, and remediation system 100. For the sake of clarity, a single user device 80 is depicted, but it will be understood that the system 100 can accommodate many user devices 80 operated by different users at different times or simultaneously. In the illustrated example, the user device 80 includes a central processing unit (CPU) 81, memory 82, a network interface 83 for connecting to the public network 90, and a display 84. Executing on the CPU 81 is a graph query and display app 85, which generally receives user input (e.g., via input mechanisms 66 such as a keyboard, mouse, and/or touchscreen, among other examples) indicating configuration information for the system 100 and/or queries and sends the configuration information and/or queries to tracking and remediation subsystem executed on the server system 118. The graph query and display app 85 also receives from the server system 118 information such as graph information for rendering graphical depictions of portions of the entity relationship graphs 162 on the display 84 based on the graph information, via a graphical user interface 87, which the graph query and display app 85 renders on the display 84 for receiving and displaying the configuration, graph query, and graph information. In one example, the graph query and display app 85 executes within a software program executing on the CPU 81, such as a web browser, and renders specifically a browser user interface 138 within a larger GUI 87 serving the graph query and display app 85, web browser, and other applications and services executing on the CPU 81 of the user device 80.

In one typical example, as the event data is collected from the data sources 12, it is used to generate the entity relationship graph 162 of all entities 8 of interest. This temporal entity relationship graph 162 is typically displayed to IT and security team users that access the server system 118 via a browser executing on their own user device 80. This browser user interface 138 displays a graphical user interface (GUI) that presents graphs generated by the graph subsystem 126. The server system 118, via the API 136, allows the users to query the graph subsystem 126 for graph patterns of interest.

In general, in the stored and/or presented graphs 162, individual entities 8 are modeled or represented as vertices, or entity nodes 10. Attributes about the entities 8 can be stored and/or presented as attributes on the entity nodes 10. Relationships between entities 8 are modeled or represented as edges 11 between the entity nodes 10. The edges 11 can also have attributes or properties associated with them. The stored graphs, presented graphs, entity nodes 10, and edges 11 will be described in further detail below with respect to subsequent figures.

Figure 1B:
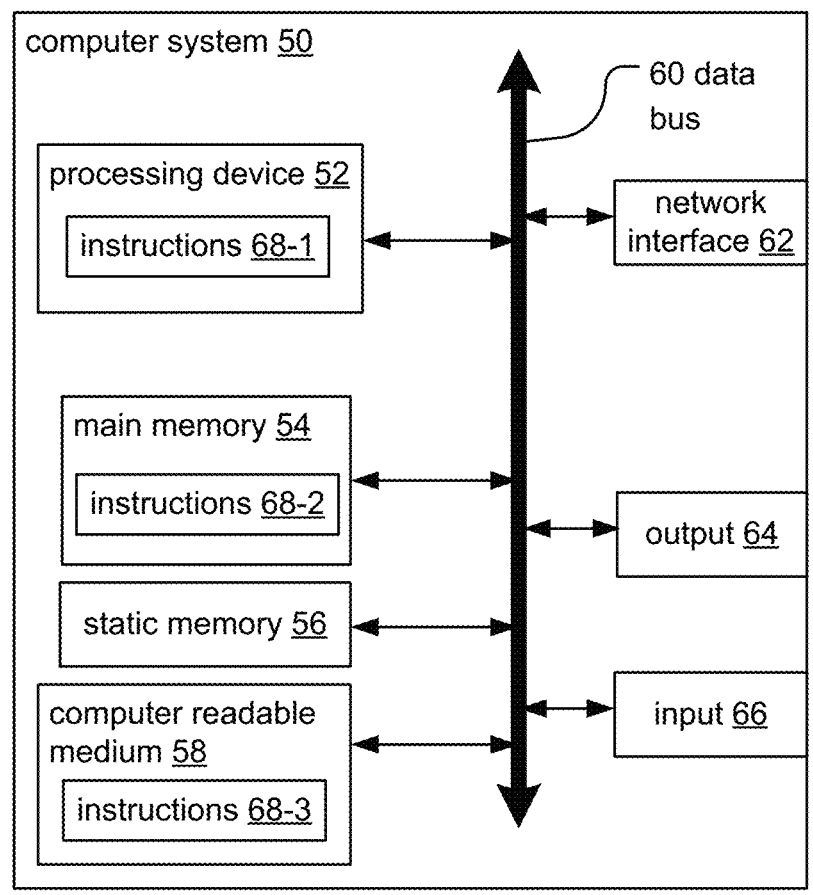
FIG. 1B is a schematic diagram showing an exemplary computer system for implementing the presently disclosed workstation system, server system and/or user device.

FIG. 1B is a schematic diagram showing an exemplary computer system 50 for implementing any of the server systems 118 and/or the user devices 80 illustrated and described in connection with FIG. 1A.

The computer system 50 comprises a processing device or CPU 52, main memory 54 (e.g., read-only memory (ROM), flash memory, dynamic random access memory (DRAM) such as synchronous DRAM (SDRAM), etc.), and a static memory 56 (e.g., flash memory, static random access memory (SRAM), etc.), which may communicate with each other via a data bus 60. Alternatively, the processing device 52 may be connected to the main memory 54 and/or static memory 56 directly or via some other connectivity means. The processing device 52 may be a CPU or used to implement a CPU (such as the CPU 81 of the user device 80 or any controllers of the workstation system 112 or the server system 118), and the main memory 54 or static memory 56 may be any type of memory or may be used to implement any type of memory systems (such as the memory 82 of the user device 80, the data store(s) 164 of the server system 118, or any memory systems of the workstation system 112).

The processing device 52 represents one or more general-purpose processing devices such as a microprocessor, central processing unit, or the like. More particularly, the processing device 52 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 52 is configured to execute processing logic in instructions 68 (e.g., stored in the main memory 54, or in the processing device 52 itself, or provided via the computer readable medium 58) for performing the operations and steps discussed herein.

The computer system 50 may or may not include a data storage device that includes instructions 68-3 stored in a computer-readable medium 58. As previously mentioned, the instructions 68 may also reside, completely or at least partially, within the main memory 54 and/or within the processing device 52 during execution thereof by the computer system 50, the main memory 54 and the processing device 52 also constituting computer-readable medium. The instructions 68 may further be transmitted or received over a network such as the public network 90 via a network interface 62 (e.g., the network interface 83 of the user device 80, or any network interfaces of the workstation system 112 or the server system 118) of the computer system 50.

While the computer-readable medium 58 is shown in an exemplary embodiment to be a single medium, the term "computer-readable medium" should be taken to include a single medium or multiple media (e.g., a centralized or distributed database, and/or associated caches and servers) that store the one or more sets of instructions 68. The term "computer-readable medium" shall also be taken to include any medium that is capable of storing, encoding, or carrying a set of instructions for execution by the processing device 52 and that cause the processing device 52 to perform any of one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps (to be described). The steps of the embodiments disclosed herein are performed by hardware components and are embodied in machine-executable instructions 68, which may be used to cause a general-purpose or special-purpose processing device 52 programmed with the instructions 68 to perform the steps.

Those of skill in the art would further appreciate that the various illustrative logical blocks, modules, circuits, algorithms, apps, subsystems, services, engines and/or servers described in connection with the embodiments disclosed herein may be implemented as electronic hardware, instructions 68 stored in memory 54 or in another computer-readable medium 58 and executed by a processor or processing device 52, or combinations of both. Memory disclosed herein may be any type and size of memory and may be configured to store any type of information desired. To clearly illustrate this interchangeability, various illustrative components, blocks, modules, circuits, and steps have been or will be described generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, circuits, algorithms, apps, subsystems, services, engines and/or servers described in connection with the embodiments disclosed herein may be implemented or performed with a processing device 52. A processing device may be a CPU or microprocessor, but in the alternative, the processing device may be any conventional processor, controller, microcontroller, or state machine. In other cases, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof could be employed. A processing device 52 may also be implemented as a combination of computing devices, e.g., a combination of a DSP and a microprocessor, a plurality of microprocessors, one or more microprocessors in conjunction with a DSP core, or any other such configuration. In fact, the processing device may be virtualized to run on interchangeable hardware.

It is also noted that the operational steps described in any of the exemplary embodiments herein are described to provide examples and discussion. The operations described may be performed in numerous different sequences other than the illustrated sequences, Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one skilled in the art. Those of skill in the art would also understand that information may be represented using any of a variety of different technologies and techniques. For example, data, instructions, commands, information, bits, symbols, and chips that may be referenced throughout the preceding or following description may be represented by voltages, currents, electromagnetic waves, magnetic fields or particles, optical fields or particles, or any combination thereof.

Architecture

Figure 1C:
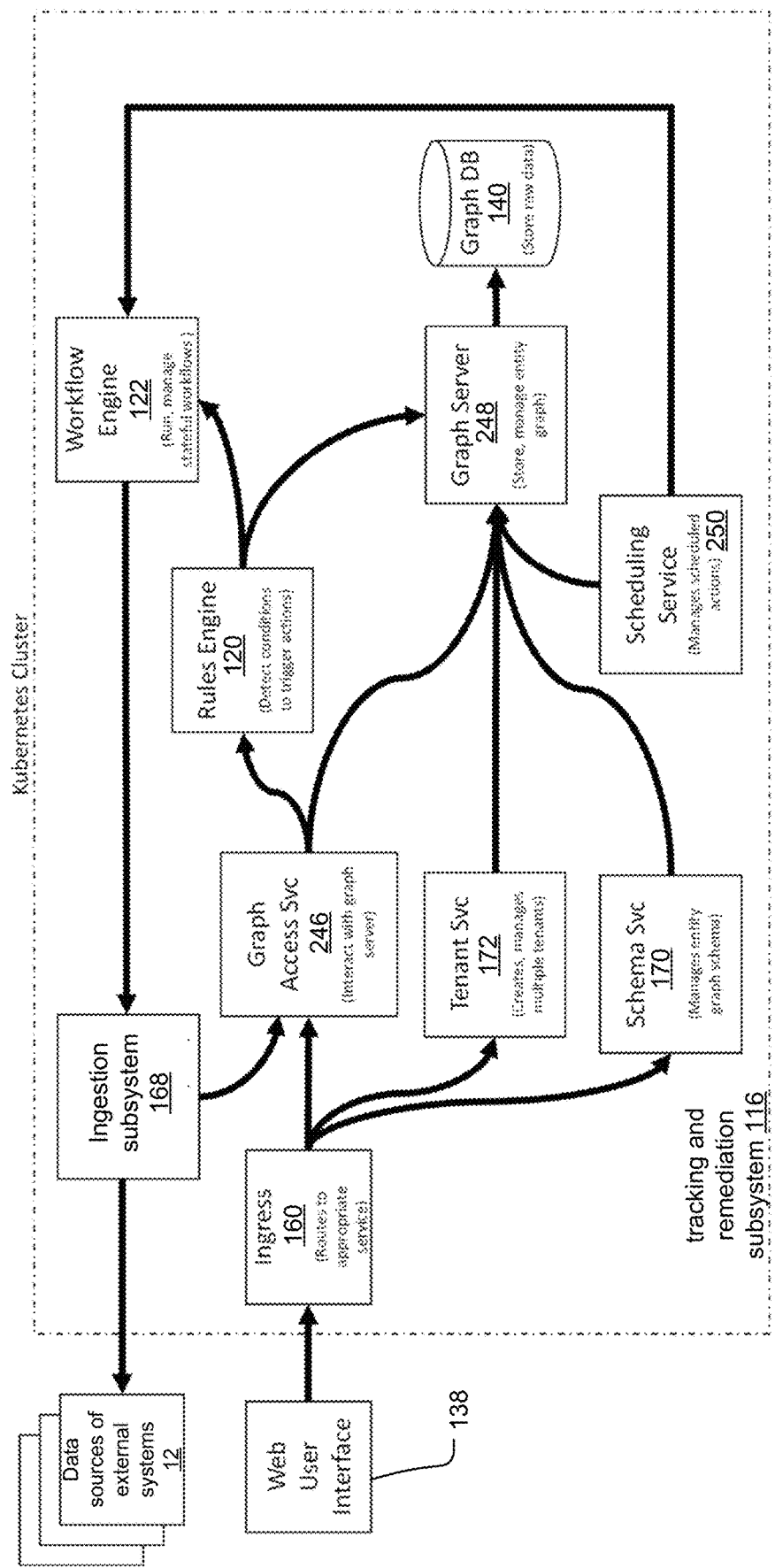
FIG. 1C is a schematic diagram of the exemplary entity discovery, resolution, tracking, and remediation system showing a more detailed view of how data flows through the system.

FIG. 1C is a schematic diagram of the exemplary entity tracking and remediation subsystem 116 according to one embodiment of the present invention, showing additional details about how data flows through various components of the system.

These various modules, processes, services, engines, and/or subsystems, which will be described in further detail below with respect to the current and/or subsequent figures, are generally each associated with separate tasks. In some cases, they are discrete modules, or they are combined with other modules into a unified code base. They can be running on the same server or different servers, virtualized server system, or a distributed computing system.

In general, the tracking and remediation subsystem 116 stores the aggregated, cleaned correlated, normalized and confirmed entity relationship information in the data store(s), such as in the graph database 140. The tracking and remediation subsystem 116 also induces various enrichment and/or remediation processes with respect to the entity relationship information and the computer environment 5 (e.g., supplementing, correcting, or updating the entity relationship information, effecting changes to the computer environment 5, effecting changes in other external environments), interaction with systems within the computer environment 5, and/or interaction with external systems 12 and technologies. The tracking and remediation subsystem 116 also provides access to the entity relationship information for the one or more user devices 80.

In embodiments, the tracking and remediation subsystem 116 receives and stores the aggregated, cleaned correlated, normalized and confirmed entity relationship information and/or receives the aggregated, cleaned correlated, normalized and confirmed event data from and generates the entity relationship information based on the aggregated, cleaned correlated, normalized and confirmed event data, and stores the generated entity relationship information.

In one embodiment, the tracking and remediation subsystem 116 generates the entity relationship information by generating a temporal entity relationship graph 162 based on the information and/or other sources. The entity relationship graph 162 represents the entities 8, properties of the entities, and relationships between the entities. The tracking and remediation subsystem 116 stores the entity relationship graph 162 in a temporal entity relationship data structure such as the graph database 140.

In the illustrated example, the ingestion subsystem 168, ingress subsystem 160, graph access service 246, tenant service 172, schema service 170, rules engine 120, scheduling service 250, workflow engine 122, graph server 248, and graph database 140 of the tracking and remediation subsystem 116 are depicted as part of a container-based system, specifically a Kubernetes cluster to thereby run on interchangeable server systems.

The graph server 248 maintains the entity relationship graph 162 and any updates to it, or queries against it. It uses a highly scalable graph database 140 as its backing store.

The graph access service 246 runs on the server system 118 and is the primary way that other systems or components, both internal and external (e.g. a user interacting with the web-based user interface 138 or a remote program accessing the graph 162 via the API 136) gain access to the graph server 248 for the purposes of updating or querying the graph 162.

The tenant service 172 runs on the server system 118 and is responsible for managing, creating, updating, deleting and providing information about separate tenants in a multi-tenant version of the system 100.

The rules engine 120 is responsible for responding to changes in the graph 162 which, based on configuration, should trigger some action, such as executing a workflow. It receives information about changes in the graph 162 from the graph access service 246. When a change triggers a rule it then executes the associated action(s) such as interacting with the workflow engine 122 to invoke the appropriate workflow. The rules engine is also capable of executing user-defined or system-defined scripts written in a scripting language such as Javascript or Python. In some cases, the rules engine 120 may access the graph server 248 directly to collect more information.

The workflow engine 122 runs on the server system 118 and is responsible for running and managing stateful workflows which are provided with the system and/or created by users of the system. The workflow engine 122 interacts with the ingestion subsystem 168 to invoke interactions with external systems 70 pertaining to the computer environment 5 for the purpose of collecting or enriching event data or invoking remediation actions and making changes to the environment 5, to name a few examples.

The scheduling service 250 is responsible for managing and executing a variety of recurring scheduled tasks. Generally, a recurring scheduled task will entail a query to identify a set of entities 8 represented in the entity relationship graph 162 that require some action and the specific action to take. One example of a recurring scheduled task would be the periodic execution of a query against the graph 162 to identify entities 8 that are out of compliance with some policy. The action might be to execute a workflow on the entities 8 returned by the query, where the workflow notifies some person(s) to take some action, or the workflow executes some automated action by calls to APIs of other software programs within or related to the computer environment 5 to remediate the policy violation. The scheduling service 250 interacts with the graph server 248, either directly or via the graph access service 246, to access the schedule configuration data. The scheduling service 250 also interacts with the workflow service, and possibly other components, to execute the configured actions.

Figure 2:
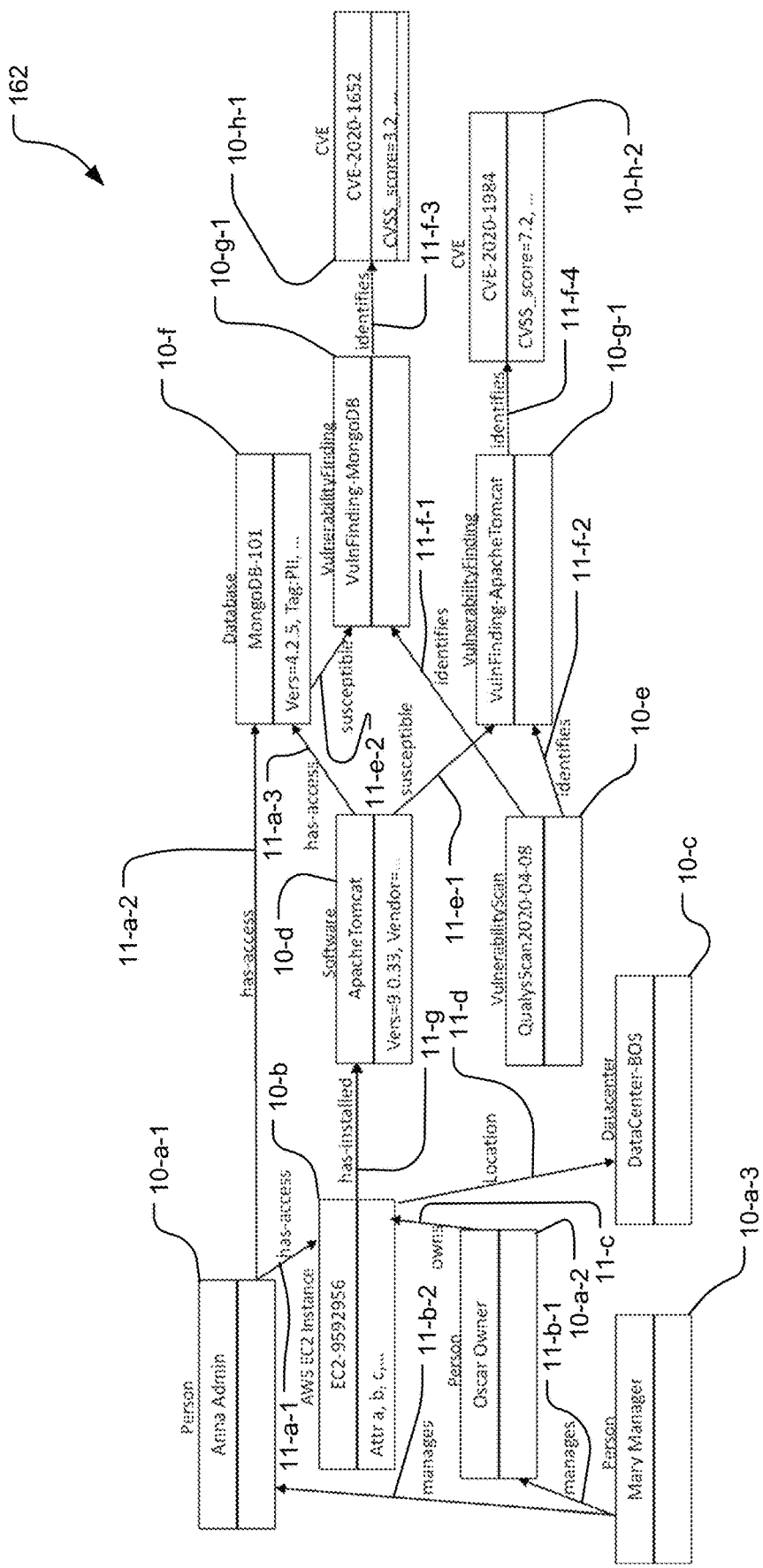
FIG. 2 is an illustration of an exemplary graph and specifically a segment of graph as displayed by the user device as part of its graphical user interface.

FIG. 2 is an illustration of an exemplary entity relationship graph 162 and specifically a segment of such a graph that would be presented to IT personnel, for example, as part of the GUI 87 and/or browser user interface 138 rendered on the display 84 of the user device 80. Additionally, the illustrated example also shows generally how the entity relationship graph 162 stored in the graph database 140 is logically organized (e.g., with nodes 10 representing entities 8 of the computer environment, edges 11 between the nodes 10 representing relationships between the entities 8 represented by the nodes 10), and additional properties and attributes associated with both the nodes 10 and the edges 11. The nodes are displayed as boxes including name in an upper portion of the box and characteristics of the entity in a lower portion of the box. The edges are lines between boxes.

In general, different types of nodes 10 are depicted, including person nodes 10-*a* representing individuals such as users that are considered entities 8 in the computer environment, AWS instance nodes 10-*b,* representing AWS server instances in the computer environment, datacenter nodes 10-*c* representing a data center in the computer environment 5, software nodes 10-*d* representing software executing within the computer environment 5, vulnerability scan nodes 10-*e* representing particular scans for vulnerabilities performed with respect to the computer environment 5 (e.g., at a particular point in time), database nodes 10-*f* representing databases within the computer environment 5, vulnerability finding nodes 10-*g* representing results of the vulnerability scans, and CVE nodes 10-*h* representing publicly available security flaws that pertain to the computer environment 5.

Similarly, different types of edges are depicted, including has-access edges 11-*a* indicating that certain entities such as users have access to other entities such as the AWS instances, manages edges 11-*b* indicating that certain individuals that are considered entities 8 in the computer environment 5 are managers for other individuals, owns edges 11-*c* indicating that certain people who are considered entities 8 within the computer environment are owners of other entities 8, location edges 11-*d* indicating where certain entities 8 are physically or geographically located with respect to another entity 8, susceptible edges 11-*e* indicating hat certain entities 8 are susceptible or vulnerable with respect to other entities 8 representing security vulnerabilities withing the computer environment 5, identifies edges 11-*f* indicating that certain entities 8 provide identification information with respect to other entities 8, and has-installed edges 11-*g* indicating that certain entities 8 such as an AWS instance has another entity 8 installed on it.

In a display context, each of the nodes 10 and edges 11 of the graph segment 162 would be represented by graphical elements (e.g., icons or shapes) displayed as part of the GUI 87. In one example, visual characteristics of the graphical elements representing the nodes 10 and the edges 11 correspond to the visual characteristics of the nodes 10 and edges 11, respectively, as they are depicted in the illustrated example, with graphical elements representing the nodes 10 being displayed as rectangular shapes enclosing textual information indicating values assigned to properties of the nodes, and graphical elements representing the edges 11 being displayed as arrows connecting the graphical elements representing the nodes 10 with textual information adjacent to the arrows indicating values assigned to properties of the edges 11.

In the illustrated example, the graph segment 162 presents a computer entity 8 represented as node 10-*b* in the graph segment 162. The computer node 10-b could have attributes recording information such as the make model of the computer, its operating system (e.g., represented by node 10-*d*), the time of its last restart, etc. There may also be users (e.g., represented by nodes 10-*a*-1, 10-*a*-2, and 10-*a*-3) interacting on the computer network. Each user is represented as a node 10-*a* in the graph segment 162, for example, with attributes such as their user id, email address, phone number, etc. If a user logs into the computer over the network this can be represented in the graph segment 162 as an edge of type logged_into from the user node to the computer node (not illustrated). This is a very simplistic example relative to normal operating conditions to be expected for the presently disclosed system 100. For example, in a normal situation there will typically be many different entities 8 of interest with long sequences of relationships represented by long sequences of nodes 10 and edges 11.

It could be the case that there are several data sources 12 that have information about the same entity 8. Some examples of the data sources 12 include, but are not limited to, public cloud infrastructure, identity and access management products, vulnerability scanning products, endpoint management products, SIEM products, ticketing systems, networking infrastructure, network firewalls, etc. In some cases, that information from different data sources 12 about the same entities 8 will be non-overlapping and additive. In some cases, the information might be conflicting.

In one embodiment, the ingestion subsystem 168 operates according to configurable rules for dealing with joining the event data from different data sources 12 and/or resolving conflicting information from different sources 12 as collected by the entity event collectors 110 and then storing the result in the entity relationship graph 162 and underlying relational database 140 of the graph subsystem 126. In another embodiment of the present system and method, the information from each data source 12 can be stored independently, and any combining or conflict resolution is invoked at run time as the information is being queried.

Figure 3:
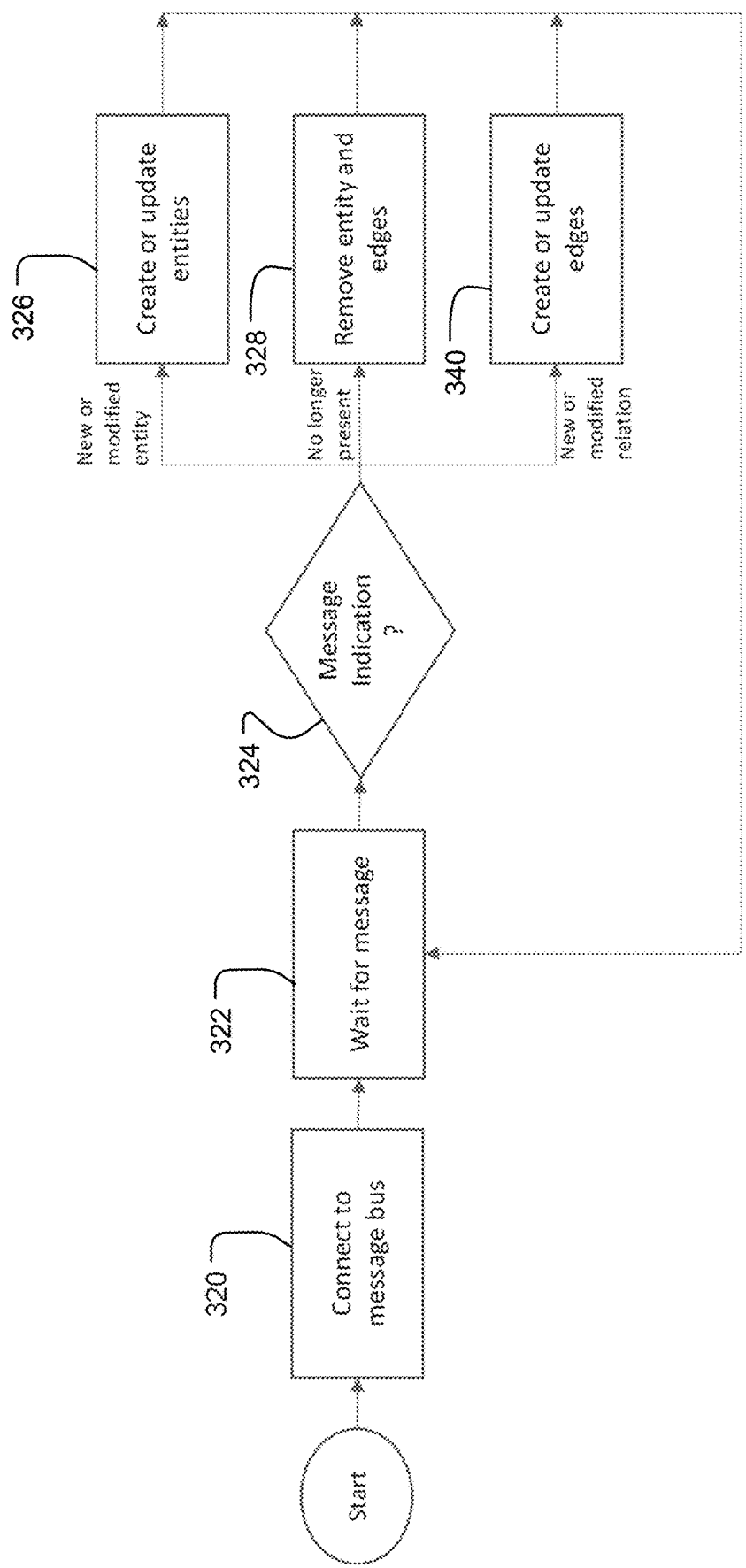
FIG. 3 is a schematic diagram showing the operation of the ingestion subsystem 168.

FIG. 3 illustrates the operation of the ingestion subsystem 168. In the preferred embodiment, the ingestion subsystem 168 is responsible for connecting to the various information sources including the external systems 70 via some API, message bus, or other suitable programmatic interface. Through this interface the ingestion subsystem 168 monitors for changes indicating a) that a new entity has been added or discovered and it collects all of the interesting attributes about that entity, b) that an entity that previously existed but is no longer present, or c) that a relationship has been established or terminated between two nodes.

In the case of situation "a", where a new entity is discovered the ingestion subsystem 168 is responsible for creating a new entity node in the entity relationship graph 162 stored in the graph database 140. This new node is decorated with all of the attributes of interest which are collected from the information source. The present system and method use a type system to understand how to ingest, interpret, and process all of the attributes provided by the information source. The type system will be covered in more detail below.

In the case of situation "b", the ingestion subsystem 168 is responsible for deleting, or otherwise marking as no longer valid or active, the node which is no longer present and all edges to or from that node.

In the case of situation "c", the ingestion subsystem 168 is responsible for establishing edges in the graph between the related nodes.

Note that these three cases need not be discrete events. In other words, it may be the case that while ingesting data from an information source 12, multiple new entities and their relationships to each other, and to other entities, may be provided in a single response or block of data and the ingestion subsystem can establish all of the necessary nodes and relationships at one time. It may also be the case that information acquired from an information source indicates that an entity has a relationship to another entity not yet in the graph and the ingestion subsystem might not have sufficient information to establish a node for that related entity. In this situation the preferred embodiment can either a) leave the reference unresolved with the intent of resolving it at a later time if and when the node does get created, or b) it can create the reference, but refer to a special type of "placeholder" node which can be updated or replaced when all of the necessary information for creating the node is available.

There is no standardized API or programmatic interface for information sources. Each information source will generally have a unique interface and a unique data set and schema as well as a different Uniform Resource identifier (URI) for accessing the interface, a unique set of credentials for authenticating, etc. For that reason, the preferred embodiment of the ingestion subsystem 168 includes custom software for ingesting data from each information source. In order to manage the information needed to access and authenticate to the information source the preferred embodiment includes what we will refer to as an "ingestion profile" to hold and manage this information. These ingestion profiles are protected through the use of encryption or some other similar mechanism. When ingesting data from an information source the associated custom ingestion software will pull the necessary information from the ingestion profile to locate, connect to, and authenticate to the information source. It may also optionally acquire configuration information which can be used to vary how it executes the ingestion.

It is worth noting that the present system and method will often assume that all information provided by the information source which might be useful and relevant for the targeted problem domain and thus the system will ingest all information for each entity and store that ingested information with the resulting node.

Ingestion of information will typically take one of two forms, depending on the capabilities of the information source and the nature of the information being ingested. The first form is a real-time feed of changes in the information source. The second form is a periodic batch feed of information.

FIG. 3 is a logic diagram showing how real-time information is ingested by the ingestion subsystem 168 from a streaming information source.

In the case of a real-time information feed the system connects to the information source via some suitable interface in step 320, such as a message bus. In step 322, the ingestion subsystem 168 waits for messages from the information source related to the three situations discuss above. The information source would be configured to post messages to the message bus meeting those same three criteria. If a message indicates that a new entity has been detected, then the ingestion subsystem 168 uses the information provided in the message to create a new node in the entity relationship graph 162 stored in the graph database 140 in step 326.

If there is not sufficient information in the message, for example, not sufficient property details, then the integration may need to leverage other APIs or mechanisms to proactively collect the necessary information.

If the message indicates that a previously present entity is no longer present then the information source integration would delete the node from the graph along with any edges to or from that node. Finally, if the message indicates that a relationship has been added, or has changed in any way, then the ingestion subsystem 168 adjusts the edges in the graph 162 appropriately in step 328. Once the system has processed that message, it repeats the process by pulling another message off of the message bus or waiting for one to be available.

On the other hand, in step 340, if the ingestion subsystem 168 interprets the message as a new or modified relationship, then the relationship graph 162 is updated to manifest that relationship in a created or updated edge.

Figure 4:
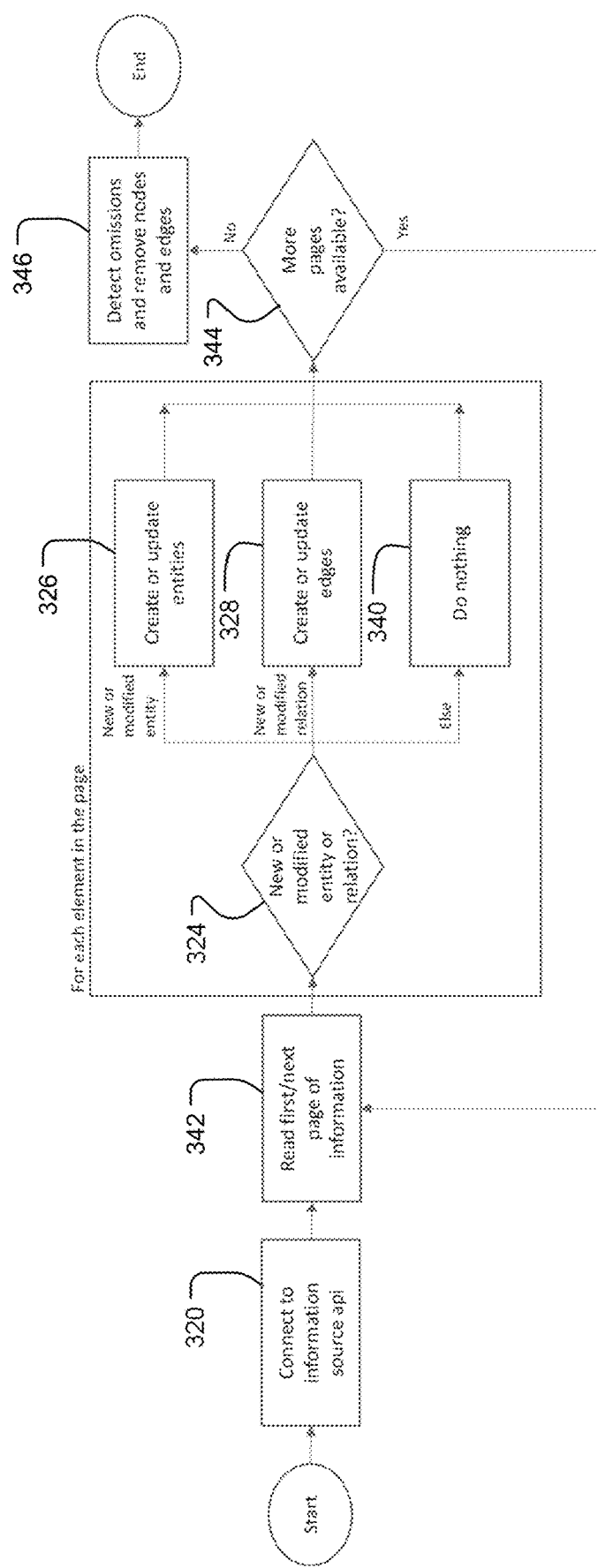
FIG. 4 is a schematic diagram showing the batch mode operation of the ingestion subsystem 168.

FIG. 4 is a logic diagram showing batch mode ingestion by the ingestion subsystem 168.

In the case of a periodic batch ingestion, the ingestion process is typically invoked manually, or it is scheduled using some scheduling mechanism to run at some predetermined interval. If the information source is capable of providing information which has changed since the last ingestion then the information source can pull just the information which has been modified and for each element implement the same logic in regards to adding new or updating nodes and properties, removing nodes, or modifying edges in the graph. If the information source does not have that capability then the ingestion subsystem 168 needs to pull all the information and detect changes, additions or omissions in the information.

In any event, in step 320, the ingestion subsystem 168 connects to the information source.

In the illustrated example, a paging process is employed in step 342. In many cases where there is a large amount of information, the information source may not support pulling all of the information in one API call, or it may be inefficient to try to process all of the information at one time. The system calls the API for some subset, or page, of information and records and process that information as described previously in steps 324, 326, 328, and 340 as described in connection with FIG. 3.

The ingestion subsystem 168 then requests the next page if available as determined in step 344, and processes it, and so on, until all of the information available from the source has been processed. As the paging is processing the ingestion subsystem 168 is recognizing and updating new or modified nodes in the graph.

Finally, after all the pages have been processed, the ingestion subsystem 168 invokes a batch finalize process in step 346. In the batch finalize process, the system determines which nodes in the graph had been ingested from that information source in the past but were not processed in the current ingestion. These are assumed to be entities which are no longer present. The finalize process continues to remove the corresponding nodes and edges in the graph.

If the process fails to load all of the information for some reason such as a network interruption or a software bug in the information source, the system detects that and does not execute the finalize step. Instead, it waits until the next time that the full information source can be ingested. In this way, the system is resilient to various failures which might interrupt the ingestion process.

Schema Definition and Schema Service

In order to consume, process, and interact with data ingested from various and disparate information sources the present system and its method employs a declarative and computer-readable schema definition language and format built on, and extending, standards such as JSONSchema and OpenAPI. This schema definition language supports the description of each type of entity to be ingested and represented in the graph including details about, among other things, what attributes the entity type can, or must, include and what other entity types it can, or must, have relationships to. Entity types, and the schema definition language, support a multiple-inheritance model such that an entity type can inherit from, or implement the fields from, another entity type and then include additional attributes or valid cross-entity relationships of its own. Every entity type is described using this schema definition language.

In existing schema definition languages, it is common to declare the structure and constraints of a datatype, but the present system is also concerned with how to relate data from multiple systems and applications from independent vendors, and with describing relationships between data elements and entities in a way that supports graph-based query and display techniques. Consequently, this schema definition language includes explicit markup fields that define relations to other types. This allows data corresponding to this schema to be automatically transformed from an object representation into a graph representation.

Commonly, descriptions of existing enterprise application APIs, and the schema for returned data, are available in some machine-readable, declarative format such as OpenAPI. These schema definitions afford for extensions which can be used for the inclusion of graph-specific markup, including concepts such as relationships, constraints and derived properties.

FIG. 5 shows an example of schema definition 350 in OpenAPI which is used by the ingestion subsystem 162 when ingesting from an information source to convert data ingested from the information source into proper graph structures in the graph server 248, via the graph access service 246.

The example is a small snippet of the OpenAPI schema which has been extended using this method as indicated by elements starting with "x-samos-". The system uses such a declarative format to define various entity types which will be ingested from information sources and stored in the graph 162. OpenAPI is currently being used but it is not meant to be limiting. Rather, any suitable format can be used.

Figure 6:
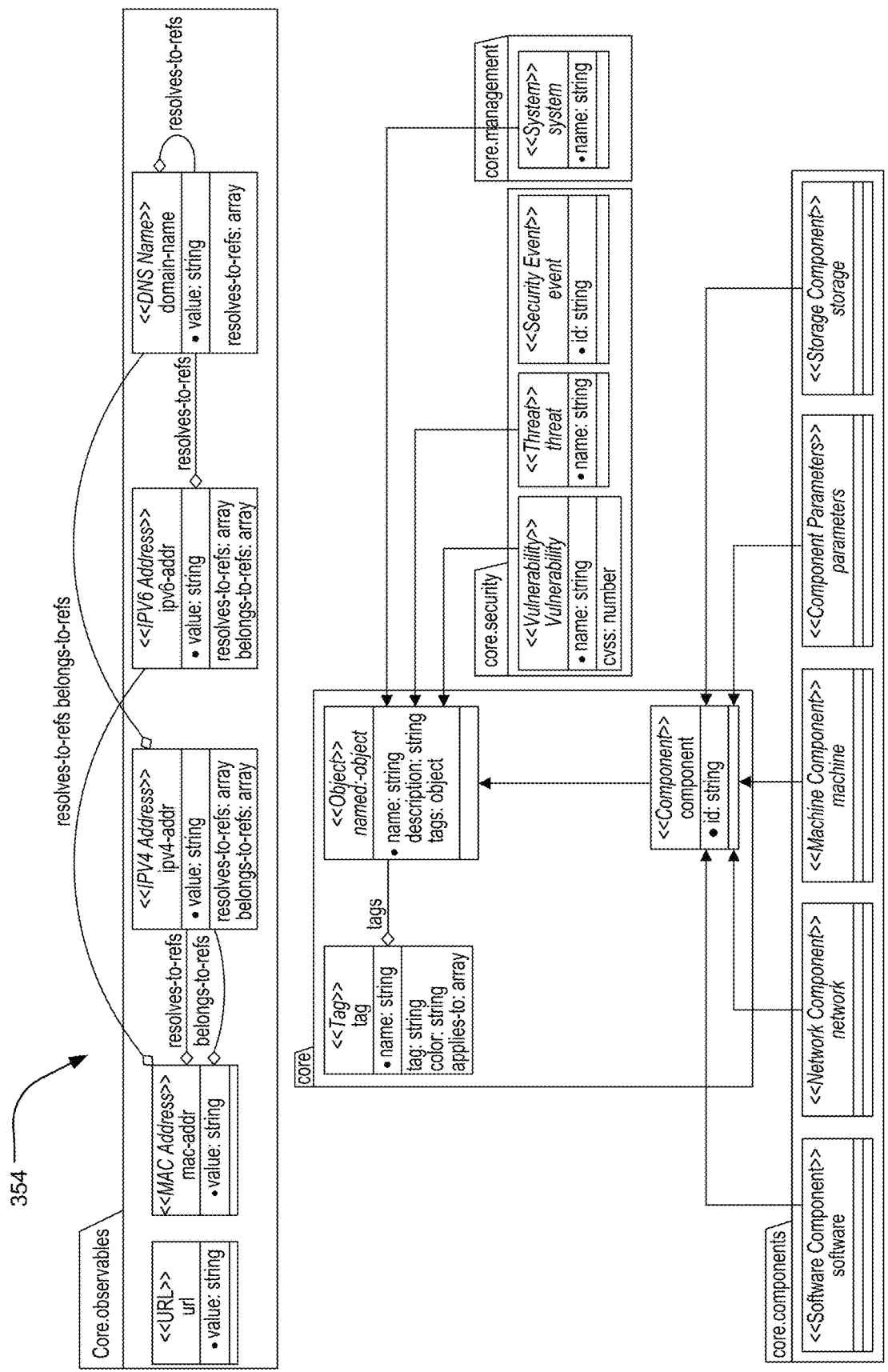
FIG. 6 is a visual example a hierarchical type schema.

FIG. 6 is a visual example of a hierarchical type schema 354 which is managed by the schema service 170 and stored in the graph server 246. It is also used by the ingestion subsystem to convert data ingested from information sources into proper graph structures in the Graph Server (via the Graph Access Svc).

In general, the present system and its methods incorporate a hierarchy of generic entity types, which are appropriate for the general problem domain(s) being targeted. In the example domain of cybersecurity, these default types might include computers, networks, computer storage, IP addresses, software vulnerabilities, etc. This hierarchy of default entity types are included when an instance of the system is initially installed or deployed. However, in many cases there will be information source or organization-specific variations of the types of entities, that need to be tracked in the system. This can commonly happen due to the fact that each information source will have source-specific information which is not considered in the default generic entity types. In the cybersecurity example this can happen when an organization integrates information from an information source in their environment which provides information on entities not considered by the existing default entity types.

For this reason, the present approach supports the ability for additional types to be defined and imported into the system. This capability includes creating entirely new entity types or extending existing built-in or custom entity types.

The built-in generic entity type for a generic computer might include attributes which are generally common for any computer. Such common attributes might include the make, model, operating system, type and number of CPU cores, etc. However, for public cloud computer instances the cloud provider APIs may provide additional, provider-specific attributes for the computer such as its cloud provider ID, the image it was generated from, hibernation/migration configuration, and many others. These additional properties would be declared in the cloud-specific computer type definition that extends the general built-in computer type. In this way, the system is extensible to support any entity types and use cases the specific organization requires.

These higher-level generic entity types are termed "abstract types" and the lower-level detailed source-specific entity types are termed "concrete types". Once new types are imported into the system the type schema definition allows the rest of the system to understand how to interact with entities of that type. This allows them to be supported just like the built-in types in every respect.

FIG. 6 illustrates an exemplary abstract entity type hierarchy. Entity types specific to particular data sources inherit and/or extend these types fulfilling or extending properties and relationships of the abstract types according to the specified entity type hierarchy, with the specific entity types specifying additional properties and relationships specific to the particular data sources.

More particularly, the present system and method incorporate a comprehensive hierarchy of default entity types which are appropriate for the general cybersecurity problem domain. This hierarchy of default cybersecurity entity types are included when an instance of the system is initially installed or deployed. However, in many cases there are organization-specific variations in the types of entities which need to be tracked in the system. This can commonly happen as cybersecurity technologies advance and new concepts emerge or when an organization integrates information from a new data source 12 in their environment 5 which provides insights on entities not sufficiently supported by the existing default entity types. For this reason, the present system and method supports the ability for additional types to be defined and imported into the system. This capability includes creating entirely new entity types or extending existing built-in or custom entity types. In this way, the system is easily extensible to support any entity types and use cases the specific organization requires. Once new types are imported into the system the schema definition allows the rest of the system to understand how to interact with entities of that type. This allows them to be supported just like the built-in types in every respect.

As previously mentioned, the schema service 170 is responsible for consuming schema definitions, validating, and storing them. Also, through the schema service the entity type schema can be accessed and used by various other aspects of the present system and method. In one example, when a new entity 8 is discovered, the entity type is integrated via the schema service 170 to ensure the entity attributes are collected, validated, and recorded properly. This understanding of the entity type schema is also used to recognize, resolve and validate references to other related entities 8. When an entity 8 or relationship is being added to the graph 162 the system validates that the entity S or relationship meets the requirements of the associated entity type to ensure data integrity. Similarly, when the GUI 87 is displaying information about a particular entity 8, it can interrogate the schema service 170 to collect information that is helpful in making decisions regarding how to display the information. When a user is trying to generate a graph pattern query against the graph 162, the GUI uses information about the entity type schema to guide the user through the query generation process by only offering options which are supported by the schema of the types involved. There are many other examples of ways the entity type definitions can be used improve the capabilities of the present system and method.

Similarly, when the user interface is displaying information about a particular entity it can interrogate the type subsystem to collect information which is helpful in making decisions regarding how to display the information. For example, is a given field an integer, a string, a Boolean, or a date? When a user is trying to generate a graph pattern query against the graph the user interface can leverage knowledge about an entity type's schema to guide the user through the query generation process by only offering options which are declared by the schema of the types involved. There are many other examples of ways the entity type definitions can be used improve the capabilities of, and user experience of interacting with, the present system and method.

Another benefit of organizing entity types in a hierarchical fashion is that it can enable users to interact with all the types of a certain hierarchy collectively (e.g., computers) by referencing the higher-level abstract, or generic, type and its defined properties without having to be concerned with the variations and extreme details of the lower-level concrete types which extend it.

Hierarchical Property Fulfillment

As discussed, each integration to a specific information source will define a set of source-specific concrete types which extend one or more of the built-in abstract or generic types and will attempt to fill in all the properties defined in the extended abstract or generic type(s). Each information source will have a unique set of information and there is no way to pre-determine how information from specific information sources can best fill in the properties of the abstract types. This must be decided by the author of the information source integration who has the most intimate knowledge of the information provided by the information source. In some cases, there may need to be some transformation of one or more elements from the source information in order to derive a value suitable to fulfill properties of the extended abstract or generic type. In any case, the present system and method provides that the logic or algorithm for doing so must be recorded in a way which enables the system to automatically implement it as it processes the data. Here, the logic for filling in, or "fulfilling", the properties of the extended abstract or generic types is encoded in declarative form. One preferred approach is to annotate the type definitions themselves.

FIG. 7 is an exemplary snipit 356 of type schema definition in OpenAPI showing how markup is used to indicate which properties of a concrete type ingested from a data source should be used to fulfill properties of its corresponding parent abstract or generic type. It is also used by the ingestion subsystem 168 to convert data ingested from information sources into proper graph structures in the graph server 248 via the graph access service 246 while implementing the default abstract or generic types.

In the case where there is a direct mapping between an information element from the information source, and therefore a property in the definition of the corresponding concrete type, and a property defined in an extended abstract or generic type, the property definition in the concrete type can be annotated using some agreed upon labels to indicate the extended type and property being directly fulfilled. One possible example demonstrated in the type definition snippet in FIG. 7. It uses the standardized label "x-samos-fulfills:" to indicate that the property in question fulfills a property of an extended type. This is then followed by the labels "type-name:" to indicate the abstract type, and "property-name:" to indicate the specific property of that type being fulfilled. This is just an illustrative example and not meant to limit the present system and method. Any suitable scheme for indicating the logic for fulfilling abstract or genetic properties from the properties provided by an information source is acceptable.

Derived Properties

FIG. 8 is an exemplary snipit 358 of type schema definition in OpenAPI showing how markup is used to indicate which properties of a concrete type ingested from a data source can be used to calculate an appropriate value for a property of the extended abstract type. In this case the fulfilling value is not copied directly from a property of the ingested entity but rather is being derived from one or more direct properties of the ingested entity that should be used to fulfill properties of its corresponding parent type.

Here, there is not a direct mapping between an information element from the information source to a property of an extended abstract type, but that there is some transformation from one or more properties of the information source, the present system and method provides that an algorithm be stated in some declarative form defining the transformation logic. One illustrative approach would be to utilize the concept of a "derived property" in the type definition. FIG. 8 shows one possible example.

In this example the type definition declares a block for derived properties. For each derived property (in this example there is only one called "name"), it defines various attributes such as its title and type. It also defines the "syntax" which is the technique which will be used to define the algorithm for transforming source information into the value to be set on the derived property. In this particular example, a standardized technology called JSONPath is being used. The type definition then uses the "value:" label to define the JSONPath statement to be used to generate the value for the derived property. JSONPath is just one example of the techniques which can be used to transform source data into values suitable to be used for the value of a derived property. As in the previous example this example goes on to use the "x-samos-fulfills:" element to declare the fulfillment of the property of an extended type.

Reference Properties

One of the important aspects of the present system and its methods is the construction of a graph that captures relationships between entities as edges between nodes in the graph. Generally speaking, source information will typically convey these relationships as field or properties with a value that is a unique identifier of the object the relationship is directed at. For example, source data for a computer may include a property for "IP Address" and the value of that property will be the unique identifier of the specific IP Address that it is related to. When this source information is ingested, it should be converted into two nodes in the graph: a "computer" node and an "IP Address" node, with an edge between them. But given the possibly vast variation between disparate information sources, there is no general way to determine which properties are meant to be referencing other objects and which are just holding simple attribute information of the current object. This must be decided by the author of the information source integration who has the most intimate knowledge of the information provided by the information source. In the present system, the indication that a field should be considered to be a reference to another entity must be recorded in a declarative way which enables the system to automatically implement the relationship in the graph as it processes the data. One preferred approach is to annotate the type definitions themselves.

FIG. 9 is an exemplary snipit 360 of type schema definition in OpenAPI showing one possible example of how to annotate the type to indicate a reference property. This figure shows a reference property declaration in a type definition snippet. The markup is used to indicate properties of a concrete type ingested by the ingestion subsystem 168 from a data source which refer to another node in the graph.

In this example snippet of a type definition you can see that a label, in this case "x-samos-ref-types:", is used to indicate that a property should be interpreted as a reference to another entity and is followed by a list of "type-name:" labels (in this case only one) which have a value indicating the type(s) which the property can refer to. In this way, as the system and method is ingesting data from an information source, and it comes across a property which has been marked up accordingly in the type definition, the ingestion process can ensure that the graph is updated properly to represent it as an edge to the node of the matching type and with a unique id matching the value of the property being ingested. It should be noted that the system further provides that the abstract type may define a set of relationships and the concrete types can define a different set of relationships and relationships in the concrete type can be used to fulfill relationships of the abstract type so long as the concrete relationship type matches or extends the relationship type of the abstract relationship it is fulfilling.

Other Type Markup

There are many other ways in which type markup can be leveraged to provide additional metadata and insights about a type, and the data which is ingested representing an item of that type. Without limiting the current system and method, these could include an indication of which properties should be considered to be the primary key to uniquely identify the entity, declaration of which properties should be show to the user by default in the UI when examining entities of that type, which properties are required in order for the entity to be valid, which properties are immutable, whether the type should be considered an abstract or a concrete type, which other types the current type extends, etc.

Virtual Edges and Properties

As discussed above the collection of capabilities of the entity discovery, resolution, tracking, and remediation system 100 enable organizations to build a comprehensive graph of related entities interest for a particular problem space. In many cases the relationships between entities which a human user may consider being direct can actually end up being quite long and complex multi-hop relationships when considering the detailed technical implementation of particular information sources. Going back to the cybersecurity example, from a human users' perspective they may comprehend that a computer is susceptible to a set of vulnerabilities which are described by CVEs (Common Vulnerabilities and Exposures). But as technically implemented and presented by a vulnerability scanning product the computer is running a variety of software programs, that software is assessed in a specific vulnerability scan on a particular day, that vulnerability scan generates a scan report, the scan report associates a list of vulnerability findings to each software packages on the computer, the vulnerability findings reference CVEs which describe the specific vulnerabilities. Depending on the implementation the computer, software, vulnerability scan, scan report, vulnerability findings, and CVEs are all inter-related nodes in the graph, and it can be arduous for a user to interpret those complex graph relationships.

To address this issue, the system 100 employs a process and method to hide that complexity from the user through the use of virtual edges. A virtual edge is intended to appear to the user as a simple direct edge between the nodes which are most natural, intuitive and simple to interact with. In the case of the example above, the system implements a virtual edge between a computer and all of the vulnerability findings to which it is related via the complex graph relationships described above. This is accomplished without actually modifying the graph structure which was constructed by ingesting the data from the various information sources. This is achieved by extending the type definition of the "computer" type using the general markup techniques already discussed. In this specific case, markup is added to the type definition to declare a virtual edge with a given name. The markup will further include a graph traversal definition which describes the arbitrarily complex graph relationship between the type being marked up and the intended target of the virtual edge.

FIG. 10 shows a type definition snippet 362 demonstrating an illustrative example declaring a virtual edge from nodes of one type to related nodes of another type by the ingestion subsystem 168.

In this example, the first line indicates that the following entries will be declaring virtual edges. The second line states that the virtual node will be named "vulnerabilities." The third line is a comment. The fourth line indicates that "gremlin" will be the graph syntax/language which will be used to define the relation pattern, or traversal. Gremlin is a standardized graph query language. The fifth through eighth lines define a first Gremlin operator called "inE" with an argument of e:VulnScanner.finding:VulnScanner-asset-id.

The ninth line defines a second Gremlin operator called "outV." The final line declares the node type of the node the virtual edge will point to.

Gremlin is a standard graph traversal query language which is fully documented. See for example docs.janusgraph.org/v0.4/basics/gremlin/. In short, this virtual edge declaration indicates that when the system encounters this virtual edge when evaluating a traversal query it should identify inbound edges to the node which are labeled "vulnScanner-asset-id" coming from nodes of type "vulnScanner.finding" and, for those edges, identify the nodes which the edges are emanating from. The resulting set of nodes are then used as the values, and therefore the destinations, for the "vulnerabilities" virtual edges.

This happens to be a very simplistic example to demonstrate the concept. In reality, the traversal definitions can be arbitrarily complex and made up of any number of operators.

Figure 11:
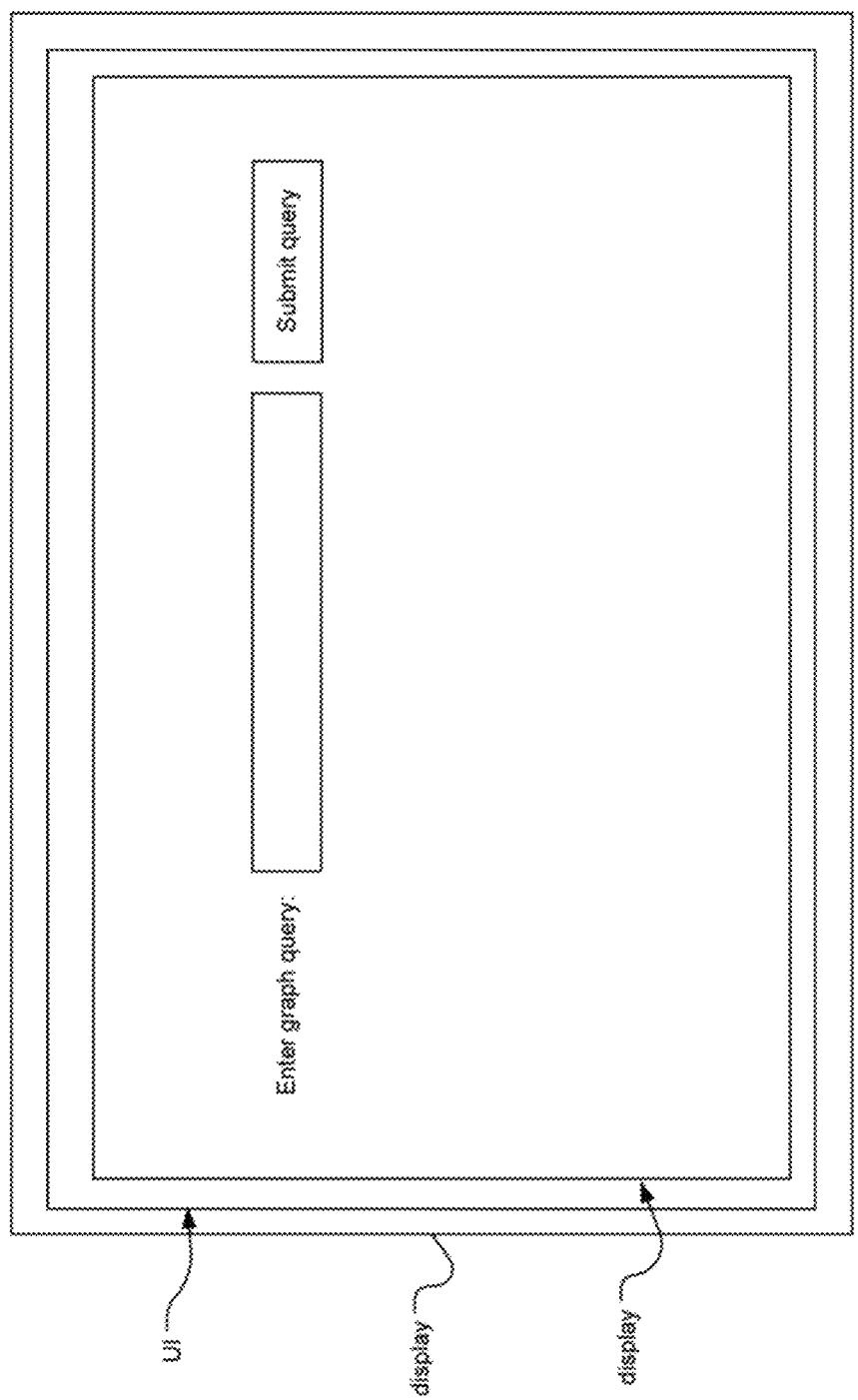
FIG. 11 is a web user interface 138 presented on the user device 80 for entering queries.

With these virtual edge declarations in place the user can enter graph queries as if the virtual edges were actual edges in the graph model. These queries are submitted from the Web User Interface 138 presented on the display 84 of the user device 80 as shown in FIG. 11. This will often run in the user device's web browser, through the ingress 160 to the graph access service 246. The graph access service 246 detects when queries attempt to reference a virtual edge and will modify the query to replace that portion with the associated graph traversal definition declared by the virtual edge. The result will be a graph traversal query which achieves the pattern perceived by the user as if there were an actual edge existing where the virtual edge was defined.

Correlation

The present system also provides for correlation across several distinct nodes in the graph which are referring to the same actual entity in the real world from the perspective of the user. Many disparate information sources may have different information about the same actual entity. When ingesting data from each information source the system creates a discrete "concrete" node, along with any indicated edges, in the graph. The concept of correlation is the process of detecting which of these various nodes are actually referring to the same conceptual entity from the perspective of the user and then making affordances so that a user can interact with the graph as if all the nodes which are correlated together are represented by a single node in the graph. To accomplish this, the system provides that an additional node, which will be referred to as a correlation node, be added to the graph and that the correlation node include edges to all of the corresponding correlated concrete nodes.

Given the arbitrary variation between information sources there is no way to generally predict how it will be determined that two or more concrete nodes generated from different information sources are referring to the same actual entity and, therefore, should be correlated. This system encodes the method of determining correlation in the type definitions of the various concrete type. The method involves each correlatable concrete type identifying a) the property(s) whose value should be used to assess correlation (the correlation property), b) agreeing on the common abstract type which they all extend and which will be used as the type for the resulting "correlation node" (the correlation type), and c) common "correlation keys" which will be used to identify which values should be compared to each other. In its most basic form, if two entities are ingested whose types define a correlation property with the same correlation key, and the same correlation type, and which contain the same value, then they will be considered to correlate. In this case, the ingestion logic will create a correlation node in the graph if one does not already exist for that correlation and it will add edges from the correlation node to the concrete nodes which are deemed to correlate. If another node is later ingested which also declares a correlation property with the same correlation key and correlation type, and has the same value then, rather than creating another correlation node, an edge is created from the existing correlation node to this new correlated concrete node.

FIG. 12 is an exemplary snipit 364 of type schema definition in OpenAPI showing how markup is used by the ingestion subsystem 168 to indicate which properties of a concrete type ingested from a data source should be used to determine which concrete nodes should be correlated with other concrete nodes.

This is an example of a correlation declaration. This illustrative example snippet provides a concrete type definition. A property name "mac" is being defined. The "x-samos-correlation" element is being used to indicate that this property is a correlation property and is to be used to evaluate correlation when ingesting entities of this type. The correlation key (which is just an agreed upon string) and correlation type indicate that the value of this property should be compared to the value of properties of other entities which have been similarly declared to correlate across correlation-type of core.components.machine with a correlation-key of core.observables.mac-addr.value.

Figure 13:
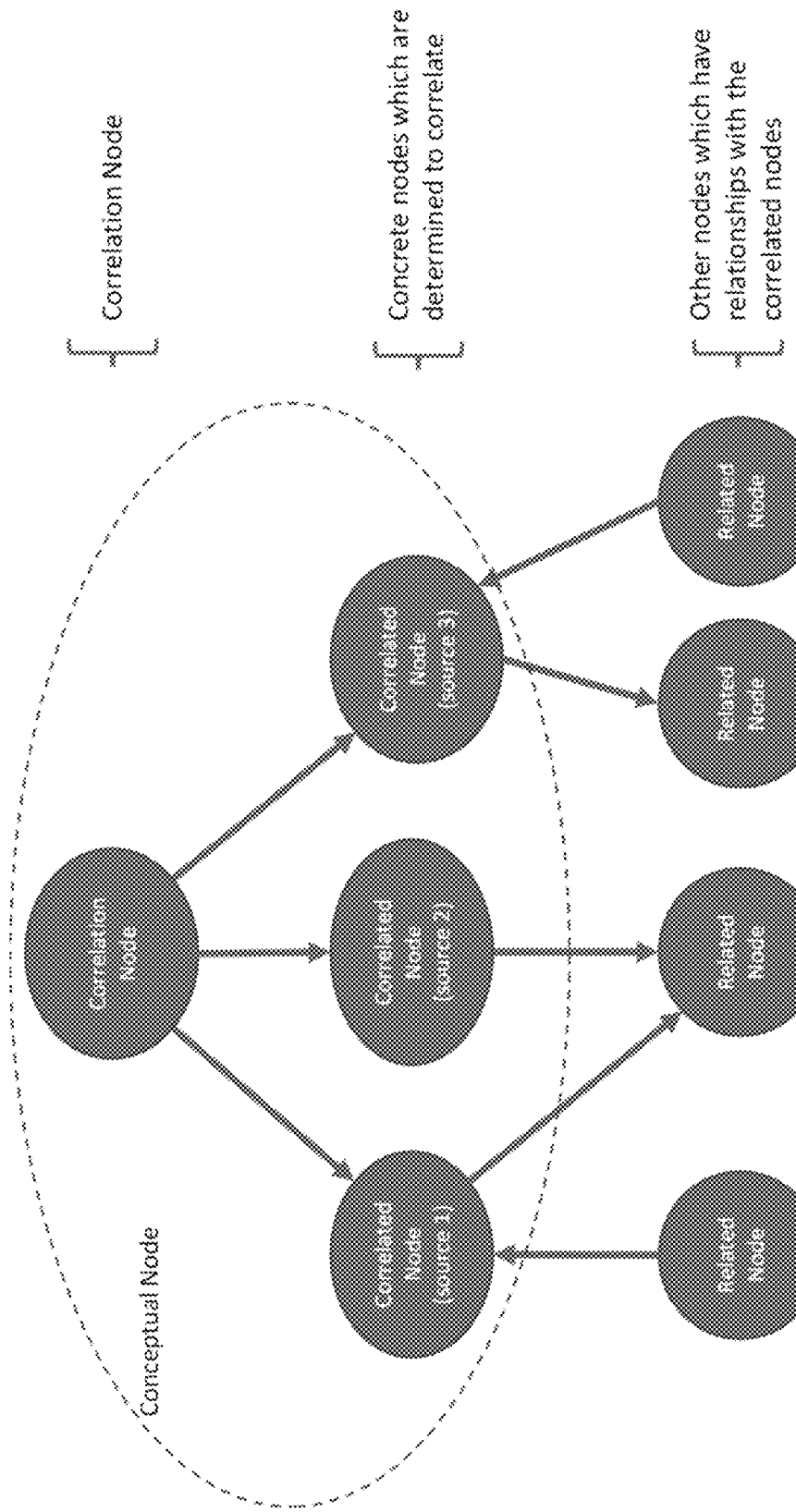
FIG. 13 is a schematic diagram showing how correlation between multiple concrete nodes is implemented.

FIG. 13 is a visual representation of how correlation between multiple concrete nodes is implemented in the graph server. It shows the organization of the graph for a group of three correlating entities. This illustrative example shows a possible resulting graph structure generated for three correlating concrete nodes referenced by a single correlation node. The correlated nodes for the different source then refer to four related nodes.

In one preferred embodiment, these correlations are stored in the graph 162 such that each unique triplet of correlation type, correlation key, and correlation value, are stored as a unique "correlation triplet" node in the graph with these three values stored in associated properties on that node. Each time an entity is ingested which includes correlation values, the system searches for the matching correlation triplet node. If it is not found, then one is created. In either case, an edge is then added from the entity node to the correlation triplet node indicating the entity node "offers up" that specific triplet. This will create transitively connected groups of entity and correlation triplet nodes.

Figure 14:
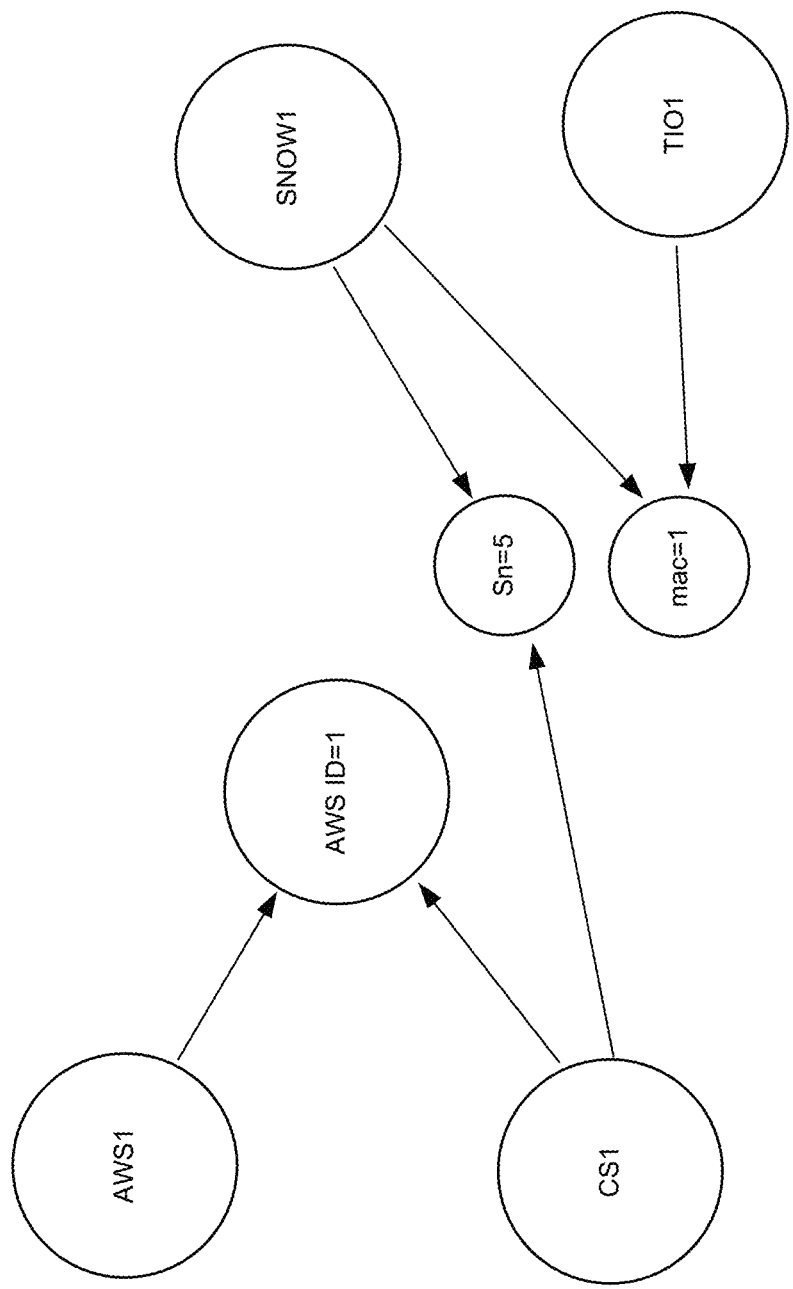
FIG. 14 is a schematic diagram showing correlation triplet nodes.

FIG. 14 illustrates an example group where "AWS1", "CS1", "TIO1" and "SNOW1" all represent concrete entity nodes, and "awsid=1", "sn=5", and "mac=1" represent correlation triplet nodes.

Once a batch of entities are ingested from an information source an operation is executed which groups together entity nodes which are linked through a transitive set of links through correlation triplet and entity nodes. Then, for each grouping of entity nodes, it is determined if any of the grouped nodes are already linked to by a correlation node. If not, a new correlation node is created. In either case, an edge is then added from the correlation node to each of the group entity nodes in that group. All of the entity nodes linked to from a given correlation node are considered to be correlated together.

FIG. 15 describes this logic as pseudo code. The result of this operation generates the correlation grouping previously discussed and illustrated in FIG. 13.

The correlation process and logic discussed so far represents what could be considered the general or default correlation logic. However, there can be certain localized anomalies in data ingested from certain information sources which will cause erroneous correlation. For example, imagine that a particular organization may have a practice of entering a serial number of "123456789" in situations where the serial number is unknown when computers are being registered in the organization's asset register. If serial number is being used as a correlating property then, according to the correlation process described above, all of these machines would be erroneously considered to be correlated together as a single conceptual node. In this case this specific organization would like to be able to exclude the value "123456789" from being used for correlation whenever it is encountered. Conversely, there may be a situation where a particular organization reliably fills in a particular custom property which can confidently be used to correlate entities and they would like to extend the correlation logic described above to also consider that property.

For both of these scenarios the system 100 provides a mechanism for a given organization to modify the default correlation behavior by adding custom correlation rules which will be interpreted and implemented in addition the default behavior. In the preferred embodiment these rules are implemented in one of two forms; exclusion rules or inclusion rules.

FIG. 16 shows exemplary markup 366 defining an "exclusion rule" to affect the logic implemented by the ingestion subsystem 168 to create correlation nodes in the graph server 248 and edges to the appropriate correlating concrete nodes.

The first line holds a unique id for the rule. The second line indicates that it is an exclusion rule. The third and fourth lines are a human-friendly name and description for the rule. The fifth line indicates the correlation key which the rule applies to. The sixth line indicates the correlation value to exclude/ignore. The last line is optional and can specify a script expression which can be executed to calculate the value to be excluded.

FIG. 17 shows and exemplary inclusion rule 368. Note that the "rule-type:" value indicates an "include" rule.

What has been described above is one illustrative example of an algorithm for determining correlation where two nodes are determined to correlate if one or more similarly declared properties match based on property value, correlation key and correlation type. Various other algorithms can also be considered which may be more effective for a particular problem domain. For example, requiring that two or more values must correspond in order to consider the two entities to be correlated. Another includes a "score" in the correlation declaration and the algorithm could accumulate scores across multiple correlation matches between two entities and the corresponding nodes are only considered to be correlated if the accumulated score meets some threshold. Other algorithms can be imagined and there is not a limit to a specific algorithm but the concept that the algorithm can be specified declaratively or otherwise agreed upon across the information sources and their related node types.

Data for correlation may not match exactly at a binary level. Various types of properties have different conditions that may determine equality for correlation purposes, for example case-insensitivity, alternate formatting, and other factors. The algorithm for performing correlation may flexibly include rules and strategies for applying the appropriate equality or similarity tests.

The system also uses a correlation node which is created when two or more concrete nodes are determined to be correlated are created with a type commonly agreed to as the correlation type. Going back to the example shown in FIG.

12, this is defined in 6th line as indicated by the correlation-type element. So in this case, the correlation node would be of type core.components.machine. Note that the correlation node is of an abstract type which is extended by all of the correlating nodes, and all of those correlating nodes are optionally fulfilling the properties of that abstract type.

The system 100 further provides that the correlation node can inherit those extended properties being fulfilled by the various correlated concrete nodes. The problem is that the various concrete nodes can be fulfilling a given extended property differently. One concrete node may fulfill a given extended property as "x", another may fulfill it as "y" and a third may fulfill it as "z". The system provides an algorithm that can be defined to resolve these conflicts. That algorithm can be specified in the types or an algorithm can be embedded in the system implementation.

One illustrative example would be a strict prioritization algorithm where each correlation property is assigned a "priority" in the type definition (as in the last line of FIG. 12) and the value of the correlating property with the highest priority is used to fulfill the property on the correlation node. Another illustrative example algorithm would be a voting scheme where count is provided in which correlating properties propose the same value and the most commonly agreed upon value wins. There are many other algorithms could alternatively be implemented. The concept is the algorithm can be specified declaratively or otherwise agreed upon across the information sources and their related node types.

Abstract Model and Abstract Queries

As discussed above, the current system 100 ingests information about a collection of related entities from a variety of information sources and generates a graph to represent the collection and their relationships. Rather than trying to fit the information from various information sources about a specific entity into a predefined schema on a single node in the graph, with a predefined schema, it teaches creating a separate node in the graph to model the information coming from each information source independently using a schema which is tailored to the information source. It then applies correlation logic on top of this more expansive graph to determine which nodes are actually referring to, and providing a perspective on, the same actual entity. This has the distinct advantage of being able to keep the full fidelity on information provided from each source. It also has the advantage of being able to adjust to changes in correlation logic, and to compensate for new information sources, without having to re-ingest all of the data. But this generates a different challenge in that users of the system conceptually want to think of, and interact with, a single node in the graph representing a single entity in the real world, and to think of all of the properties and relationships from the various information sources as being combined onto that single node in the graph. To address that challenge the system and method provide for layering an abstract model over the underlying graph. This abstraction allows the user to interact with the system as if there is a single node in the graph for each actual entity in the real world and combines the properties and relationships in a way that aligns with the conceptual model which is most natural for the user.

As described, each information source integration defines its own set of concrete types which extend one or more abstract types. The abstract types define the general properties and relationships for all entities in a particular class. The concrete types of a particular information source integration then extend that abstract type by adding additional properties and relationships which are unique to its view, or perspective, of entities in that class. In the cybersecurity example, a general computer will have a name, a make and model, a certain number of CPUs, an operating system, one or more IP addresses, etc. These will be defined in the abstract type for computers. But in the case of an integration with a public cloud provider, computers are virtualized and include many details which are unique to the cloud provider. In that case the concrete type for computer instances in a cloud provider like Amazon AWS will extend the abstract computer type and include AWS-specific properties such as its availability zone, an instance id, the id of the image it was generated from, etc.

To support users who prefer to interact with the system and method at the abstract level this system 100 enables the user to issue queries to the system which reference the abstract types even though there are no nodes of that abstract type stored in the graph (only concrete node types are stored in the graph). Relating it back to the cybersecurity example, if the user is interested in any computers in the graph, rather than issuing queries for all concrete types generated from various information sources like Amazon AWS computers, they can issue a query for the abstract computer type. The Graph Access Service which will ultimately receive that query and will recognize that it is referring to an abstract type and will automatically manipulate the query so that it is expanded to include all concrete types which extend the referenced abstract type before issuing the query to the graph server 248. Once the resulting modified query is issued and the results are returned from the graph server, the graph access service 246 manipulates the results so that instead of returning resulting individual concrete nodes it generates a structure emulating the corresponding abstract node but also including a collections of properties and relationships from the associated concrete nodes. In order to make the results intuitive for the user the system and method displays all results to the user as if they were of the abstract type which was queried for (e.g. a general computer instead of an Amazon AWS Computer). One example of how this might be done is to have a specific icon which represents a class of entity types (like computers) and is associated with the abstract type. This icon is used to display all nodes whose type extends the abstract type for that class.

FIG. 18 shows a graph display 370 as rendered on display 84 of the user device 80. It uses common icons for abstract entity classes.

Also, when viewing the details of a specific node the UI can highlight the properties of the abstract type while still giving the user a UI gesture to dull into the details of the concrete type if they wish.

Figure 19:
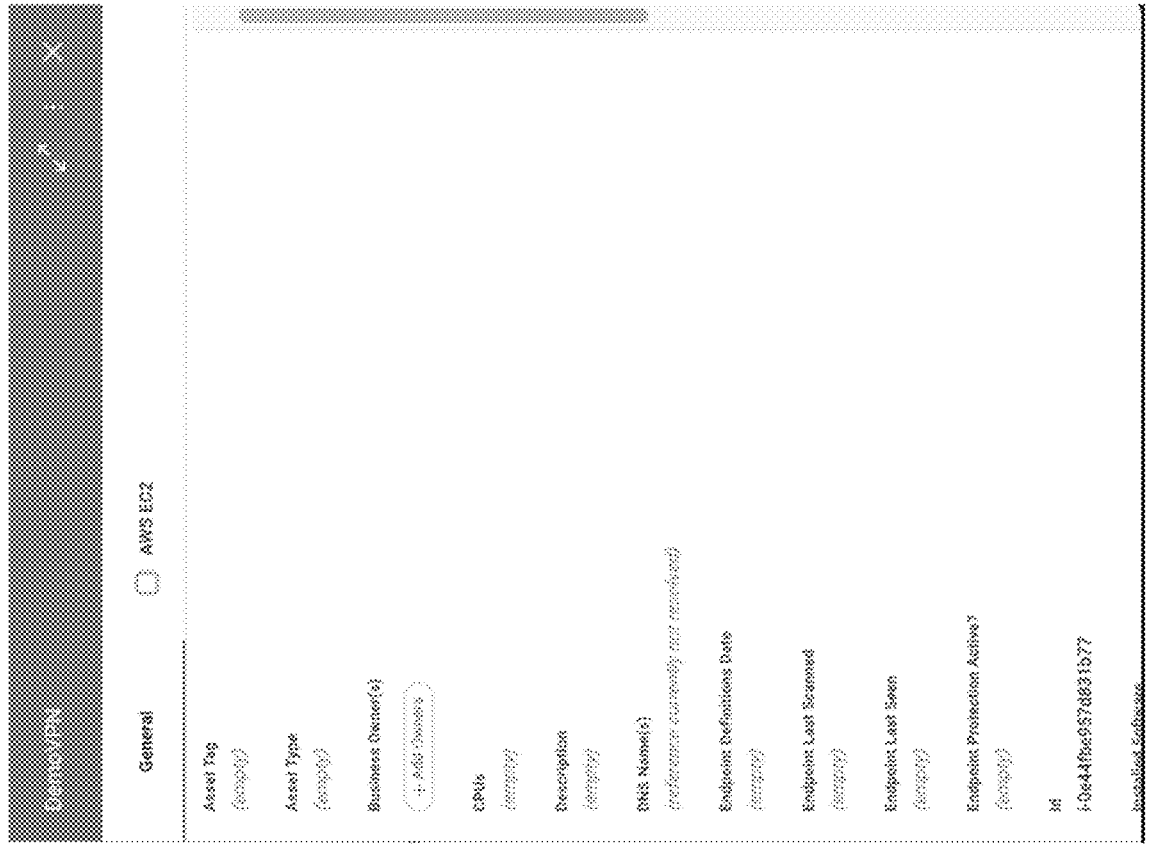
FIG. 19 shows an example user interface displaying the details of an entity as an abstract type with a tab to display properties of the actual concrete type.

FIG. 19 shows an example user interface 372 for displaying the details of an entity as an abstract type with a tab to display properties of the actual concrete type.

Correlated Groups as an Abstract Object

As discussed previously in this disclosure, the described system and method identifies concrete entities from different information sources which are referring to the same actual entity in the real world. It teaches that the corresponding correlating nodes in the graph can be pulled together by the insertion of a correlation node into the graph which has edges to each of the correlated nodes. From a user's perspective the correlation nodes and all of the corresponding correlated nodes should conceptually be consider a single entity. To support users who prefer to interact with the system and method at the abstract level system 100 enables the user to issue queries which reference the abstract types even though there are no actual nodes of that abstract type stored in the graph. When the graph access service ultimately receives such a query to execute against the graph it will automatically manipulate the query so that it is expanded to include all concrete types which extend the referenced abstract type before issuing the query to the Graph Server. Further, if the concrete types involved are extending any abstract types which are marked as being correlatable it further automatically injects graph traversal logic into the query which will traverse from the concrete types up to the correlation node and back out to encompass all the sibling correlated nodes. In this way the current system ensures that correlations of concrete nodes are conceptually handled as if they are a single aggregated node in the graph when queries are issued to the graph server. Once the resulting modified query is issued and the results are returned from the graph server the graph access service manipulates the results so that instead of returning resulting correlation nodes and individual correlated concrete nodes it combines the information from the correlated nodes into a structure emulating the corresponding abstract node but also including collections of properties and relationships from the associated correlated concrete nodes.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for identifying and remediating cybersecurity policy violations in a computer environment, the method comprising:
   using at least one computer processor to perform:
      detecting entities in the computer environment from information obtained from multiple data sources and determining relationships between the detected entities based on the information;
      for a first detected entity of the detected entities:
         determining, based on information associated with the first detected entity, whether the first detected entity corresponds to a source-specific entity type definition or a generic entity type definition;
         when it is determined the first entity corresponds to the source-specific entity type definition:
            instantiating, in memory, a first data structure associated with the source-specific entity type definition, the first data structure storing information associated with the first entity; and
         when it is determined the first entity does not correspond to the source-specific entity type definition:
            instantiating, in the memory, a second data structure associated with a generic entity type definition, the second data structure storing information associated with the first entity;
      generating an entity relationship graph by representing data structures storing information associated with the detected entities as nodes and representing relationships between the detected entities as edges between the nodes;
      executing a query against the entity relationship graph to identify a set of entities that are out of compliance with a cybersecurity policy; and
      executing one or more automated actions, via one or more application programming interface (API) calls to one or more software programs within the computer environment or related to the computer environment, to remediate violations of the cybersecurity policy by the set of entities identified using the entity relationship graph.

2. The method of claim 1, wherein generic entity type definitions are included when an instance of a cybersecurity system is initially installed to the computer environment.

3. The method of claim 1, wherein generic type entity definitions are customized to an organization deploying a cybersecurity system to the computer environment.

4. The method of claim 1, further comprising enabling users to interact with the detected entities via generic entity type definitions.

5. The method of claim 1, wherein property definitions for the source-specific entity type definitions are annotated to indicate generic entity type definitions and properties being fulfilled.

6. The method of claim 1, wherein source-specific entity type definitions contain fields that are used to fulfill properties of a corresponding parent entity types.

7. The method of claim 1, wherein source-specific entity type definitions include derived properties.

8. The method of claim 7, wherein the derived properties are used when there is not a direct mapping between an information element obtained from the multiple data sources to a property of the generic entity type definitions.

9. The method of claim 7, wherein the source-specific entity type definitions include a transformation from one or more properties of the information obtained from the multiple data sources.

10. A cybersecurity system for identifying and remediating cybersecurity policy violations in a computer environment, the system comprising:
   at least one computer processor; and
   a tracking and remediation subsystem, comprising:
      an ingestion subsystem configured to perform:
         detecting entities in the computer environment from information obtained from multiple data sources;
         determining relationships between the detected entities based on the information;
         for a first detected entity of the detected entities:
            determining, based on information associated with the first detected entity, whether the first detected entity corresponds to a source-specific entity type definition or a generic entity type definition;
            when it is determined the first entity corresponds to the source-specific entity type definition:
               instantiating, in memory, a first data structure associated with the source-specific entity type definition, the first data structure storing information associated with the first entity; and
            when it is determined the first entity does not correspond to the source-specific entity type definition:
               instantiating, in the memory, a second data structure associated with a generic entity type definition, the second data structure storing information associated with the first entity;
      a graph server generating an entity relationship graph by representing data structures storing information associated with the detected entities as nodes and representing relationships between the detected entities as edges between the nodes; and
      a rules engine for responding to changes in the entity relationship graph based on a cybersecurity policy that triggers an action on an identified set of entities that are out of compliance with the cybersecurity policy;
wherein the tracking and remediation subsystem is configured to:
  execute a query against the entity relationship graph to identify a set of entities that are out of compliance with a cybersecurity policy; and
  execute one or more automated actions, via one or more application programming interface (API) calls to one or more software programs within the computer environment or related to the computer environment, to remediate violations of the cybersecurity policy by the set of entities identified using the entity relationship graph.

11. A method for identifying and remediating cybersecurity policy violations in a computer environment, the method comprising:
using at least one computer processor to perform:
  detecting entities in the computer environment from information obtained from multiple data sources and determining relationships between the detected entities based on the information;
  for a first detected entity of the detected entities:
    determining, based on information associated with the first detected entity, whether the first detected entity corresponds to a source-specific entity type definition or a generic entity type definition;
    when it is determined the first entity corresponds to the source-specific entity type definition:
      instantiating, in memory, a first data structure associated with the source-specific entity type definition, the first data structure storing information associated with the first entity; and
    when it is determined the first entity does not correspond to the source-specific entity type definition:
      instantiating, in the memory, a second data structure associated with a generic entity type definition, the second data structure storing information associated with the first entity;
  generating an entity relationship graph by representing data structures storing information associated with the detected entities as nodes and representing relationships between the detected entities as edges between the nodes;
  using virtual edges between nodes to indicate vulnerability findings related to compliance with a cybersecurity policy;
  executing a query against the entity relationship graph to identify a set of entities that are out of compliance with the cybersecurity policy; and
  executing one or more automated actions, via one or more application programming interface (API) calls to one or more software programs within the computer environment or related to the computer environment, to remediate violations of the cybersecurity policy by the set of entities identified using the entity relationship graph.

12. The method of claim 11, wherein the virtual edges are indicated using a graph traversal query language.

13. A method for identifying and remediating cybersecurity policy violations in a computer environment, the method comprising:
using at least one computer processor to perform:
  detecting entities in the computer environment from information obtained from multiple data sources and determining relationships between the detected entities based on the information;
  for a first detected entity of the detected entities:
    determining, based on information associated with the first detected entity, whether the first detected entity corresponds to a source-specific entity type definition or a generic entity type definition;
    when it is determined the first entity corresponds to the source-specific entity type definition:
      instantiating, in memory, a first data structure associated with the source-specific entity type definition, the first data structure storing information associated with the first entity: and
    when it is determined the first entity does not correspond to the source-specific entity type definition:
      instantiating, in the memory, a second data structure associated with a generic entity type definition, the second data structure storing information associated with the first entity;
  generating an entity relationship graph by representing data structures storing information associated with the detected entities as nodes and representing relationships between the detected entities as edges between the nodes;
  identifying a correlation property for nodes used to assess correlation between a set of detected entities;
  adding correlation nodes to the entity relationship graph having edges extending to corresponding correlated nodes representing the set of detected entities matching the correlation property;
  executing a query against the entity relationship graph to identify a set of entities that are out of compliance with a cybersecurity policy; and
  executing one or more automated actions, via one or more application programming interface (API) calls to one or more software programs within the computer environment or related to the computer environment, to remediate violations of the cybersecurity policy by the set of entities identified using the entity relationship graph.

14. The method of claim 13, wherein schema definitions include reference properties that represent relationships between nodes of a source-specific entity type.

15. The method of claim 13, wherein the correlation property includes a value that is a same value among the corresponding correlated entities.

16. The method of claim 13, wherein correlation triplet nodes represent the correlation nodes and include a correlation type, a correlation key, and a correlation value.

17. The method of claim 13, further comprising enabling exclusion rules to create the correlation nodes.

18. The method of claim 13, further comprising enabling inclusion rules to create the correlation nodes.

19. The method of claim 13, further comprising enabling the query that references generic entity types even though there are no nodes of that generic entity type stored in the graph.

20. The method of claim 19, further comprising changing the query so that it is expanded to include all source-specific entity types which extend the generic entity type definitions before executing the query.

21. A cybersecurity system for identifying and remediating cybersecurity policy violations in a computer environment, the system comprising:
  at least one computer processor; and
  a tracking and remediation subsystem, comprising:

an ingestion subsystem configured to perform:
  detecting entities in the computer environment from information obtained from multiple data sources;
  determining relationships between the detected entities based on the information;
  for a first detected entity of the detected entities:
    determining, based on information associated with the first detected entity, whether the first detected entity corresponds to a source-specific entity type definition or a generic entity type definition;
    when it is determined the first entity corresponds to the source-specific entity type definition:
      instantiating, in memory, a first data structure associated with the source-specific entity type definition, the first data structure storing information associated with the first entity; and
    when it is determined the first entity does not correspond to the source-specific entity type definition:
      instantiating, in the memory, a second data structure associated with a generic entity type definition, the second data structure storing information associated with the first entity:
a graph server generating an entity relationship graph by representing data structures storing information associated with the detected entities as nodes and representing relationships between the detected entities as edges between the nodes and providing correlation nodes having edges extending to corresponding correlated nodes representing the detected entities matching a correlation property; and
a rules engine for responding to changes in the entity relationship graph based on a cybersecurity policy that triggers an action on an identified set of entities that are out of compliance with the cybersecurity policy;
wherein the tracking and remediation subsystem is configured to:
  execute a query against the entity relationship graph to identify a set of entities that are out of compliance with a cybersecurity policy; and
  execute one or more automated actions, via one or more application programming interface (API) calls to one or more software programs within the computer environment or related to the computer environment, to remediates violation of the cybersecurity policy by the set of entities identified using the entity relationship graph.

* * * * *

UNITED STATES PATENT AND TRADEMARK OFFICE
CERTIFICATE OF CORRECTION

PATENT NO. : 12,355,797 B2  
APPLICATION NO. : 17/724968  
DATED : July 8, 2025  
INVENTOR(S) : Allen D. Hadden et al.

Page 1 of 1

It is certified that error appears in the above-identified patent and that said Letters Patent is hereby corrected as shown below:

In the Claims

At Column 32, Claim 13, Line 5:
"the first detected entity. whether the first detected"
Should read:
--the first detected entity, whether the first detected--

At Column 33, Claim 21, Line 23:
"information associated with the first entity:"
Should read:
--information associated with the first entity;--

Signed and Sealed this  
Twenty-third Day of September, 2025

John A. Squires  
*Director of the United States Patent and Trademark Office*